(12) United States Patent
Noguchi et al.

(10) Patent No.: US 9,313,260 B2
(45) Date of Patent: Apr. 12, 2016

(54) DATA COMMUNICATION SYSTEM AND METHOD OF CONTROLLING THE SAME

(75) Inventors: Toshiyuki Noguchi, Tokyo (JP); Satoshi Igeta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 827 days.

(21) Appl. No.: 13/409,683

(22) Filed: Mar. 1, 2012

(65) Prior Publication Data

US 2012/0239776 A1    Sep. 20, 2012

(30) Foreign Application Priority Data

Mar. 15, 2011    (JP) .................................. 2011-057092

(51) Int. Cl.
*G06F 15/16*  (2006.01)
*H04L 29/08*  (2006.01)

(52) U.S. Cl.
CPC .............. *H04L 67/06* (2013.01); *H04L 67/306* (2013.01)

(58) Field of Classification Search
None
See application file for complete search history.

(56) References Cited

U.S. PATENT DOCUMENTS

2005/0034054 A1*    2/2005    Tsuyama et al. ............... 715/500
2005/0131907 A1*    6/2005    Matsuzawa et al. ............ 707/10

FOREIGN PATENT DOCUMENTS

| JP | 63-276651 | | 11/1988 |
|---|---|---|---|
| JP | 2002-251360 | A | 9/2002 |
| JP | 2004-040528 | A | 2/2004 |
| JP | 2007-293902 | A | 11/2007 |
| JP | 2009-265808 | A | 11/2009 |
| JP | 2011-048614 | A | 3/2011 |

OTHER PUBLICATIONS

The above foreign patent documents were cited in the Mar. 23, 2015 Japanese Office Action, which is enclosed without an English Translation, that issued in Japanese Patent Application No. 2011-057092.
The above foreign patent documents were cited in the Dec. 19, 2014 Japanese Office Action, which is enclosed without an English Translation, that issued in Japanese Patent Application No. 2011-057092.

\* cited by examiner

*Primary Examiner* — Azizul Choudhury
(74) *Attorney, Agent, or Firm* — Cowan, Liebowitz & Latman, P.C.

(57) ABSTRACT

In a data communication system including a reception side PC for receiving data, a transmission source PC for transmitting data, and a data transfer apparatus, the reception side PC notifies the transmission source PC of a reception ID as an identifier for specifying the reception side PC in data communication. Upon receiving a transmission notification containing the reception ID from the transmission source PC, the reception side PC requests a list of data corresponding to the transmission notification of the data transfer apparatus. The reception side PC requests, of the data transfer apparatus, acquisition target data based on the list of data transmitted from the data transfer apparatus in response to the request, and then acquires the data.

6 Claims, 21 Drawing Sheets

| IDENTIFIER | TRANSMISSION SOURCE NAME SET BY USER | RECEPTION ENABLE/DISABLE | TRANSMISSION ID |
|---|---|---|---|
| a | Tom | ENABLE | 4000 |
| b | Jerry | DISABLE | |
| c | George | ENABLE | |

1401, 1402, 1403, 1404, 1405, 1406, 1407

F I G. 6

| RECEPTION FOLDER (601) | TRANSMISSION SOURCE NAME SET BY USER (602) | RECEPTION ENABLE/DISABLE (603) | TRANSMISSION ID (604) |
|---|---|---|---|
| a | Tom | ENABLE | |
| b | Jerry | DISABLE | |
| | George | ENABLE | 4000 |

605
606
607

F I G. 7

| RECEPTION ID (701) | RECEPTION FOLDER (702) | RECEPTION SIDE NAME SET BY USER (703) |
|---|---|---|
| 1000 | a | Butch |
| 2000 | c | Spike |
| 3000 | | Tyke |

```
<item><link>http://XXXXX.com/1000/a/x.jpg</link><pubDate>2010/03/01 06:00:00</pubDate></item>   801
<item><link>http://XXXXX.com/1000/a/y.jpg</link><pubDate>2010/03/01 06:00:00</pubDate></item>   802
<item><link>http://XXXXX.com/1000/b/z.jpg</link><pubDate>2010/03/01 07:00:00</pubDate></item>   803

<item><link>http://XXXXX.com/1000/a/x.jpg</link><pubDate>2010/03/01 06:00:00</pubDate></item>
<item><link>http://XXXXX.com/1000/a/y.jpg</link><pubDate>2010/03/01 06:00:00</pubDate></item>
```

FIG. 13

| RECEPTION ID | TRANSMISSION ID | RECEPTION FOLDER | |
|---|---|---|---|
| 1301 | 1302 | 1303 | |
| 3000 | 4000 | e | ~1304 |

FIG. 14A

| IDENTIFIER | TRANSMISSION SOURCE NAME SET BY USER | RECEPTION ENABLE/DISABLE | TRANSMISSION ID | |
|---|---|---|---|---|
| 1401 | 1402 | 1403 | 1404 | |
| a | Tom | ENABLE | 4000 | ~1405 |
| b | Jerry | DISABLE | | ~1406 |
| c | George | ENABLE | | ~1407 |

FIG. 14B

| RECEPTION ID | IDENTIFIER | TRANSMISSION ID | |
|---|---|---|---|
| 1410 | 1411 | 1412 | |
| 1000 | a | 4000 | ~1413 |
| 1100 | c | 4100 | ~1414 |
| 1200 | b | 4200 | ~1415 |

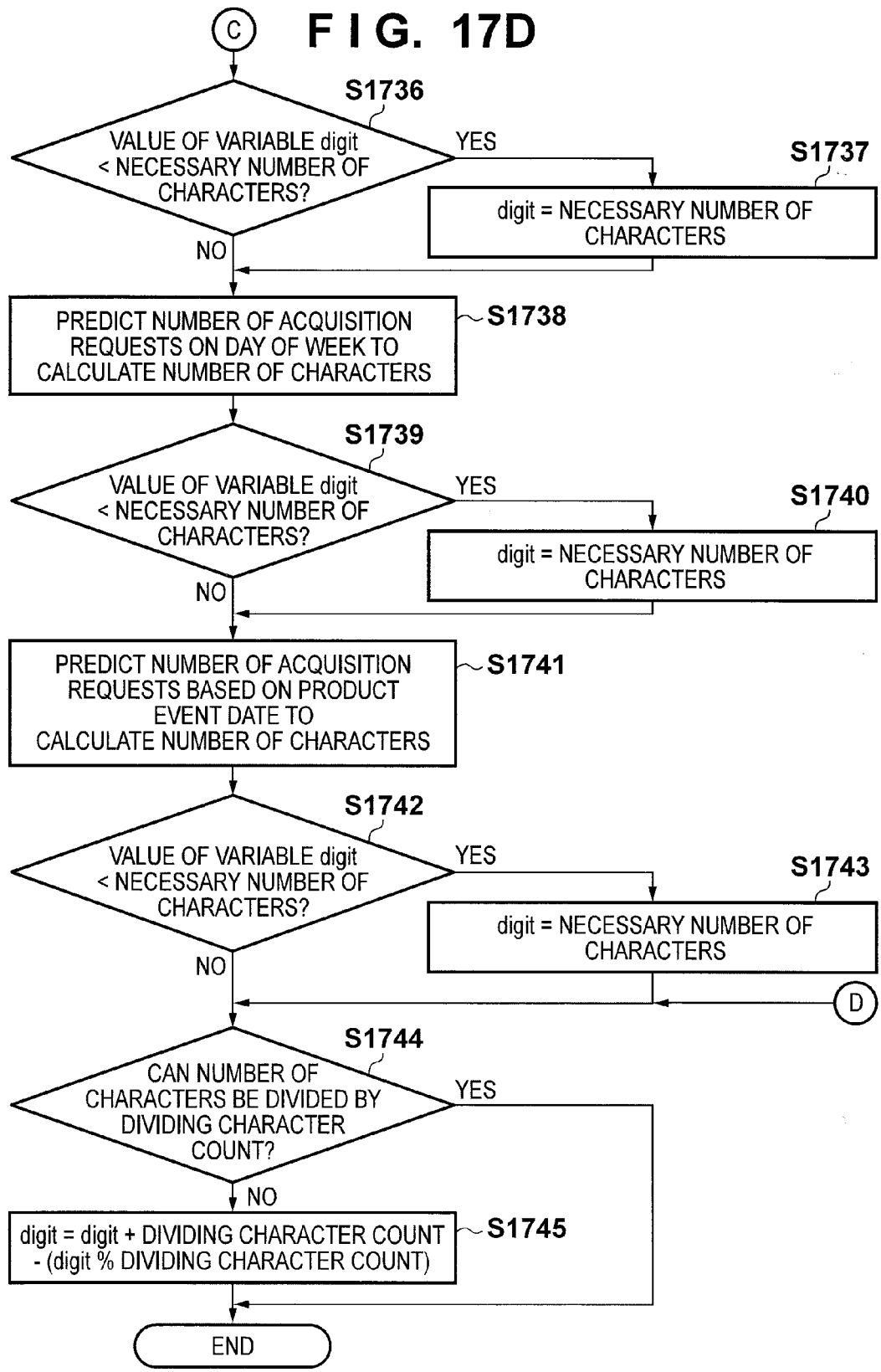

DATA COMMUNICATION SYSTEM AND METHOD OF CONTROLLING THE SAME

BACKGROUND OF THE INVENTION

1. Field of the Invention

The present invention relates to a technique of discriminating, from within a data communication system including a reception side for receiving data and a transmission source for transmitting data, the transmission source on the reception side.

2. Description of the Related Art

When transmitting data from a transmission source device to a reception side device via a network, the reception side device may display, together with the received data, a sender name designated by the user of the transmission source device (see Japanese Patent Laid-Open No. 63-276651). With this technique, the user on the reception side can identify the transmission source of the data.

In the above-described conventional technique, to display a sender name on the reception side device, it is necessary to receive the sender name given by the user of the transmission source device when the transmission source device transmits data. It is, therefore, difficult for the user on the reception side to specify and manage a transmission source device from which the user can receive data, when the user has not received any data from that specific transmission source device.

A sender name given by the user of the transmission source device is represented within the range of the input/output function of the transmission source device. If the sender name falls outside the range of the input/output function of the reception side device, it is impossible to correctly display the sender name. If, for example, the reception side device does not have fonts corresponding to a character code used in the sender name, the sender name is replaced by alternative characters in the reception side device, and therefore, the receiving user cannot discriminate the sender name.

SUMMARY OF THE INVENTION

An aspect of the present invention is to eliminate the above-mentioned problems in the conventional technology.

The feature of the present, invention is to provide a technique in which a reception side apparatus can discriminate the transmission source of data.

According to an aspect of the present invention, there is provided a data communication system including a first communication apparatus as a reception side for receiving data, a second communication apparatus as a transmission source for transmitting data, and a server, wherein the first communication apparatus comprising: an acquisition unit configured to acquire a name of a reception folder holding transmission target data by requesting the server; a notification unit configured to notify the second communication apparatus of the reception folder name acquired by the acquisition unit in association with a reception ID as an identifier for specifying the first communication apparatus in data communication; a request unit configured to request, upon receiving a transmission notification containing the reception ID from the second communication apparatus, a list of data corresponding to the transmission notification of the server; and a data request unit configured to request, of the server, acquisition target data based on the list of data transmitted from the server in response to the request of the request unit, and wherein the second communication apparatus comprising: a storage unit configured to store a reception side name in association with the reception folder according to the reception ID; and a register unit configured to register transmission target data by requesting the server to register the data in the reception folder, wherein the server transmits the list of data in the reception folder associated with the reception ID to the first communication apparatus in response to the request of the request unit, and transmits the acquisition target data registered in the reception folder to the first communication apparatus in response to the request of the data request unit.

According to an aspect of the present invention, there is provided a method of controlling a data communication system which includes a first communication apparatus as a reception side for receiving data, a second communication apparatus as a transmission source for transmitting data, and a server, the method comprising: acquiring, for the first communication apparatus, a name of a reception folder holding transmission target data by requesting for the server; notifying, for the first communication apparatus, the second communication apparatus of the reception folder name acquired in the acquisition step in association with a reception ID as an identifier for specifying the first communication apparatus in data communication; requesting, for the first communication apparatus, upon receiving a transmission notification containing the reception ID from the second communication apparatus, a list of data corresponding to the transmission notification for the server; requesting, for the first communication apparatus, acquisition target data for the server based on the list of data transmitted from the server in response to the request in the list of data; storing, for the second communication apparatus, a reception side name in association with the reception folder according to the reception ID; and registering, for the second communication apparatus, transmission target data by requesting for the server to register the data in the reception folder, wherein the server transmits a data list of the reception folder associated with the reception ID to the first communication apparatus in response to the request of the list of data, and transmits the acquisition target data registered in the reception folder to the first communication apparatus in response to the request of the acquisition target data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view illustrating a table showing an example of the structure of management data managed by the reception side PC according to the first embodiment;

FIG. 7 depicts a view illustrating a table showing an example of the structure of management data managed by the transmission source PC according to the first embodiment;

FIG. 8 depicts a view showing an example of a list of temporarily saved data associated with a requested reception ID, which has been generated by the data transfer apparatus of the first embodiment;

FIG. 13 depicts a view illustrating a table showing an example of a data structure in a data transfer apparatus used in acquiring a reception folder after notifying a transmission source of a reception ID according to the second embodiment;

FIG. 14A depicts a view illustrating a table showing an example of the structure of management data for the reception folder of a reception side PC and a transmission source name set by the user according to the third embodiment;

FIG. 14B depicts a view illustrating a table showing an example of the structure of a reception ID and transmission ID managed in association with an identifier in a data transfer apparatus according to the third embodiment;

FIGS. 17A through 17D show flowcharts for describing processing of obtaining the number of characters of a code in issuing the code in a data transfer apparatus according to the fourth embodiment;

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
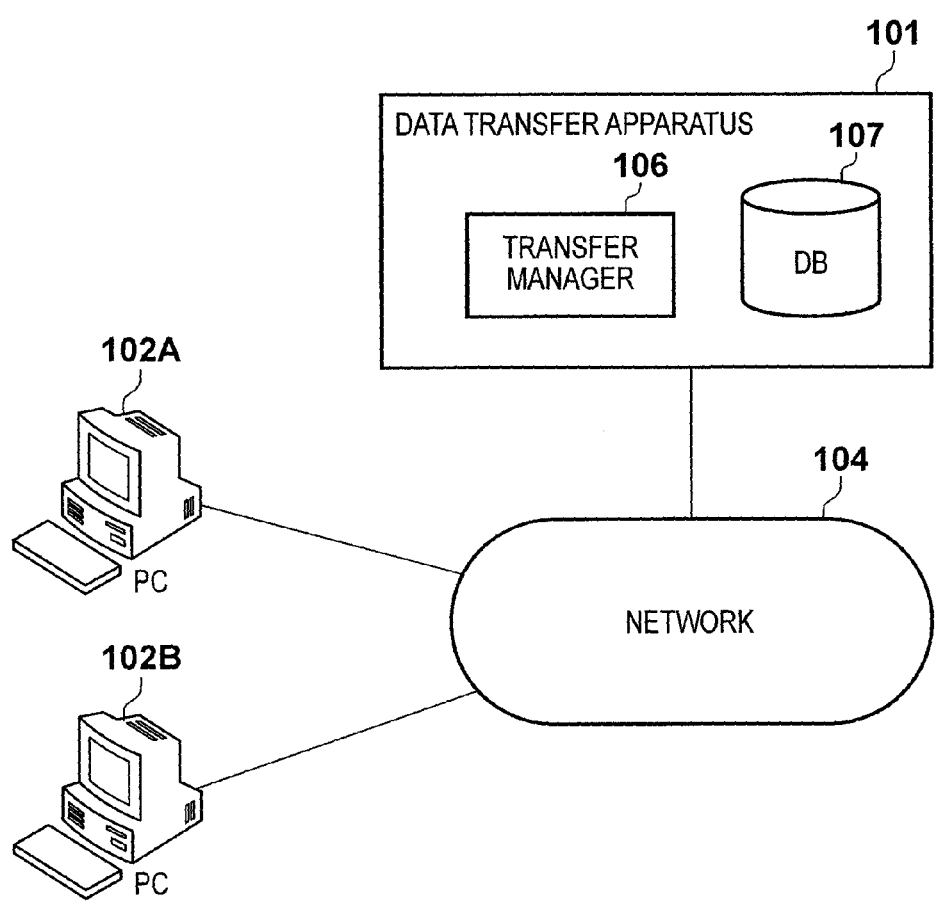
FIG. 1 is a block diagram showing the configuration of a data communication system according to an embodiment of the present invention.

FIG. 1 is a block diagram showing the configuration of a data communication system according to an embodiment of the present invention. In this transmission system, a transmission source PC 102A transfers data to a reception side PC 102B via a data transfer apparatus (server) 101.

The data transfer apparatus 101 is connected, via a network 104, with the PC 102A of a user who transmits data and the PC 102B of a user who receives data. By operating a program, the PC 102A or 102B accesses the data transfer apparatus 101 using a standard protocol such as HTTP, and acquires and analyzes information created in XML or the like. The PC 102A or 102B can display the information analyzed using the program on a display unit (denoted by reference numeral 221 in FIG. 2) of the PC. The data transfer apparatus 101 has a transfer manager 106 for managing data transfer, and a database (DB) 107 which registers the ID of each PC and the like. Note that the function of the transfer manager 106 is implemented by a program loaded into a CPU 206 and a RAM 208 of FIG. 2 (to be described later).

The user on the transmission side executes a program A in the PC 102A, and sends transmission target data to the data transfer apparatus 101 according to an instruction of the program A. The data transfer apparatus 101 thus acquires the data and temporarily saves it. The user on the reception side executes a program B in the PC 102B, and requests data of the data transfer apparatus 101 according to an instruction of the program B. The data transfer apparatus 101 sends data requested by the reception side PC 102B. The user on the reception side receives the data from the transmission source PC 102A.

Note that the PC 102 (102A or 102B) is assumed in the embodiment for descriptive convenience. However, other information processing apparatuses such as an information device may be used, or a plurality of transmission source apparatuses or reception side apparatuses may be available. In the embodiment, data is exchanged with the data transfer apparatus 101 using a program. Instead of a program, a general-purpose browser may be used. Furthermore, since data is transmitted/received to/from the data transfer apparatus 101 via the network 104, encryption such as SSL may be executed or only authorized information processing apparatuses may transmit/receive data without intervention. In the embodiment, the data transfer apparatus 101 temporarily saves transmitted data for descriptive convenience. However, whether the reception side PC is active may be determined, and if the reception side PC is active, the transmission source PC may directly transmit data to the reception side PC.

Figure 2:
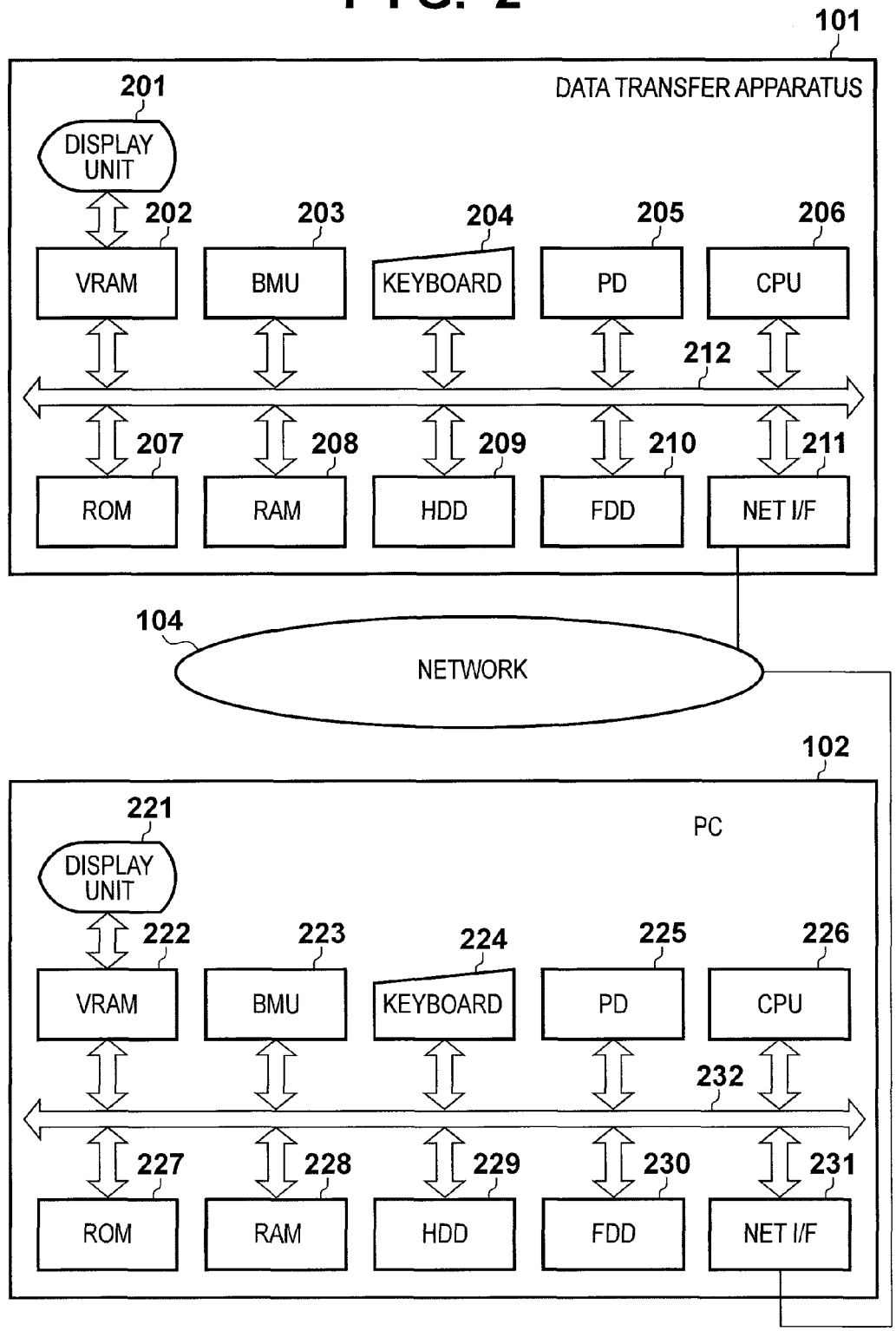
FIG. 2 is a block diagram for explaining an example of the arrangement of a PC and data transfer apparatus.

FIG. 2 is a block diagram for explaining an example of the arrangement of the PC and the data transfer apparatus 101 according to the embodiment. Note that FIG. 2 shows the arrangement of the PC 102 to represent either the PC 102A or 102B.

The data transfer apparatus 101 includes a display unit 201, a VRAM (Video RAM) 202, a BMU (Bit Move Unit) 203, a keyboard 204, a PD (Pointing Device) 205, the CPU 206, a ROM 207, the RAM 208, an HDD 209, an FD drive (FDD) 210, a network I/F 211, and a bus 212. The VRAM 202 stores display data for displaying on the display unit 201. The BMU 203 controls, for example, data transfer between memories (for example, between the VRAM 202 and another memory) and data transfer between the memory and each I/O device (for example, the network I/F 211). The keyboard 204 has various keys for inputting characters and the like. The PD 205 is used to instruct an icon, a menu, or other contents displayed on the display unit 201 or drag and drop an object. The CPU 206 controls each device based on an OS and control programs (to be described later) which are stored in the ROM 207, HDD 209, or flexible disk 210 and expanded in the RAM 208. The ROM 207 stores various kinds of control programs and data. The RAM 208 has a work area for the CPU 206, a save area for data in error processing, a load area for control programs, and the like. The HDD (Hard Disk Drive) 209 stores data and each control program executed by the data transfer apparatus 101. The network I/F 211 communicates with another information processing apparatus or printer via the network 104. The bus 212 includes an address bus, data bus, and control bus.

Similarly, the PC 102 includes the display unit 221, a VRAM (Video RAM) 222, a BMU (Bit Move Unit) 223, a keyboard 224, a PD (Pointing Device) 225, a CPU 226, a ROM 227, a RAM 228, an HDD 229, an FDD (FD drive) 230, a network I/F 231, and a bus 232. The display unit 221 displays, for example, a program window, an icon, a message, a menu, other user interface information in the PC 102. Note that the hardware configuration is the same as the above-described arrangement of the data transfer apparatus 101, and a description thereof will be omitted. Note that in the above-described arrangement, it is also possible to provide a control program to the CPU 206 or 226 from the ROM 207 or 227, the HDD 209 or 229, or the FDD 210 or 230, respectively. It is also possible to provide a control program to the CPU 206 or 226 from another information processing apparatus via the network 104 through the network I/F 211 or 231, respectively.

Figure 3:
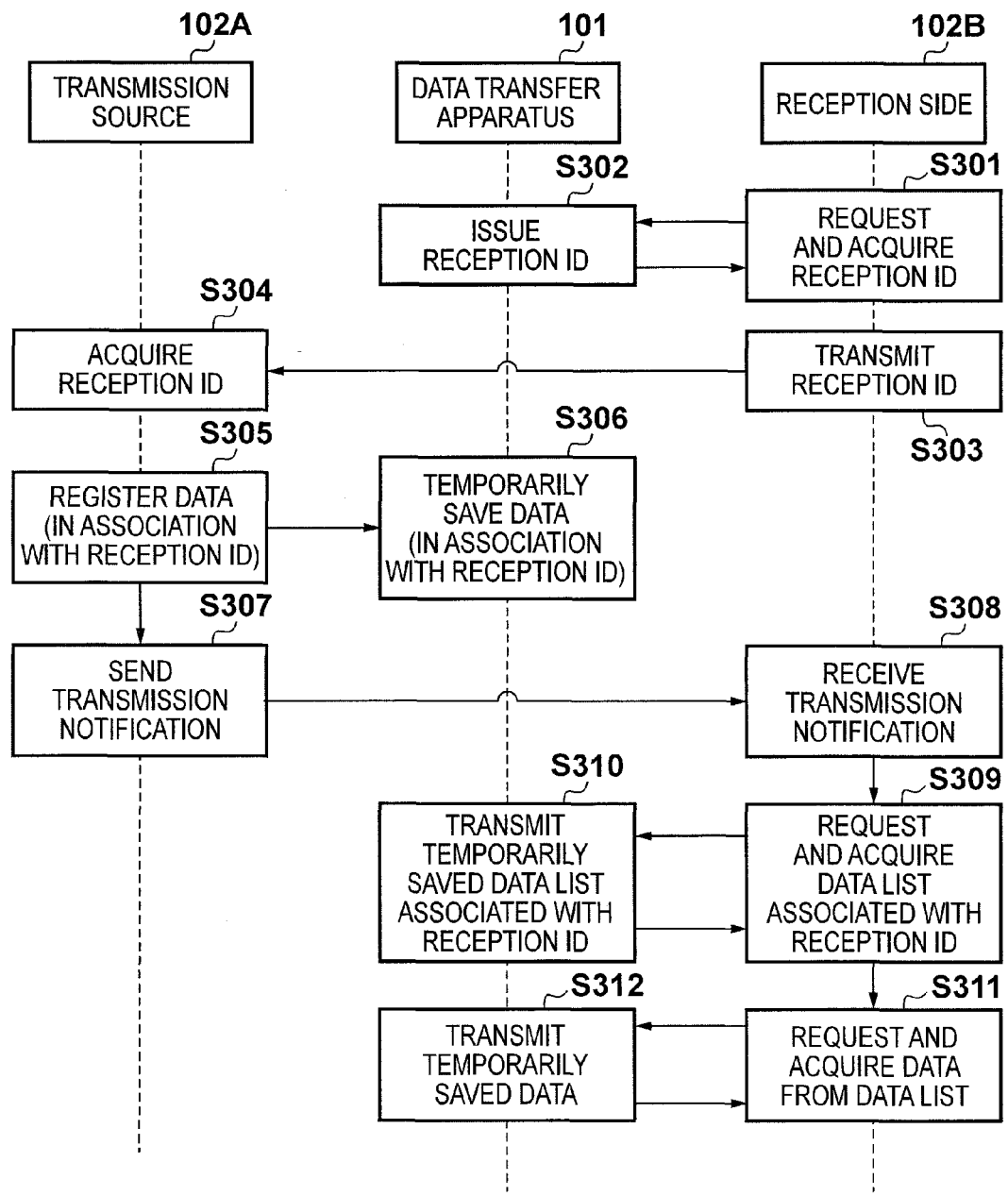
FIG. 3 is a sequence chart showing an example of a procedure of transmitting data from a transmission source PC 102A to a reception side PC 102B according to the first embodiment.

FIG. 3 is a sequence chart showing an example of a procedure of transmitting data from the transmission source PC 102A to the reception side PC 102B according to the first embodiment.

In step S301, according to an instruction of the program, the CPU 226 of the reception side PC 102B requests the data transfer apparatus 101 to acquire a reception ID. Upon receiving the request for the reception ID sent in step S301 from the PC 102B, the CPU 206 of the data transfer apparatus 101 obtains a reception ID unique in the overall system using the DB 107, and returns it to the reception side PC 102B in step S302. With this operation, the CPU 226 of the reception side PC 102B acquires the reception ID in step S301. The CPU 226 then stores the acquired reception ID as program data (the reception ID of the PC 102B) in the HDD 229 or the like according to an instruction of the program. By assigning a reception ID unique in the overall system to each reception side PC in steps S301 and S302, the data transfer apparatus 101 can systematically manage data reception destinations. Note that, although not shown, if the reception ID has already been stored as program data in the HDD 229 or the like of the reception side PC 102B, steps S301 and S302 can be skipped.

In step S303, according to an instruction of the program, the CPU 226 of the reception side PC 102B notifies the transmission source PC 102A of the reception ID acquired in step S301. In step S304, according to an instruction of a program, the CPU 226 of the transmission source PC 102A receives the sent reception ID, and stores it as program data in the HDD 229 or the like. Note that if the reception side PC 102B is close to the transmission source PC 102A, the reception side PC 102B may notify the transmission source PC 102A of the reception ID using some kind of close proximity communication over the network I/F 231. On the other hand, if the reception side PC 102B is at a remote location from the transmission source PC 102A, according to an instruction of the program, the CPU 226 of the reception side PC 102B may display information to be sent to the transmission source, and may input information for notification using the program of the transmission source PC 102A.

In step S305, the transmission source PC 102A selects transmission target data in response to a user operation, and then sends it to the data transfer apparatus 101. In this case, the CPU 226 of the transmission source PC 102A transmits the transmission target data and the reception ID of the reception side PC 102B to the data transfer apparatus 101. In step S306, according to an instruction of the transfer manager 106, the CPU 206 of the data transfer apparatus 101 refers to the DB 107 and temporarily saves the transmitted data in association with the reception ID. In this example, the transmission source PC 102A transmits the transmission target data and the reception ID of the reception side PC 102B in combination with each other for each data transmission operation for descriptive convenience. The PC 102A, however, may cause the data transfer apparatus 101 to issue an identifier such as a folder for each data transmission operation, transmit one or a plurality of items of data for each identifier, and transmit a combination of the identifier and the reception ID at a timing different from the data transmission timing.

In step S307, according to an instruction of the program, the CPU 226 of the transmission source PC 102A notifies the reception side PC 102B of data transmission. In step S308, according to an instruction of the program, the CPU 226 of the reception side PC 102B detects the data transmission notification sent in step S307, and then executes processing in step S309. Note that the data transmission notification from the transmission source PC 102A to the reception side PC 102B may be an email notification using the network 104 or a notification using telephone audio signals. The present invention is not limited to them. If the reception side PC 102B executes the processing in step S309 (to be described later) at regular intervals, the data transmission notification from the transmission source PC 102A to the reception side PC 102B is not essential.

In step S309, according to an instruction of the program, the CPU 226 of the reception side PC 102B transmits, to the data transfer apparatus 101 together with the reception ID, a request for a list of data temporarily saved in the data transfer apparatus 101 in association with the reception ID. In step S310, the CPU 206 of the data transfer apparatus 101 receives the list request. According to an instruction of the transfer manager 106, the CPU 206 returns, to the reception side PC 102B, a list in which information about data associated with the reception ID received together with the list request is described, among the data temporarily saved in step S306 described above. Upon acquiring the list in step S309, in step S311 according to an instruction of the program, the CPU 226 of the reception side PC 102B designates desired data in the list acquired in step S309, and requests it of the data transfer apparatus 101. In response to the data request, according to an instruction of the transfer manager 106, the CPU 206 of the data transfer apparatus 101 transmits the designated data to the reception side PC 102B in step S312. Note that, in step S309, the CPU 226 may display the received data list on the display unit 201 of the PC 102B, and may request, of the data transfer apparatus 101, at least one item of data which has been selected from the list by the user of the reception side PC 102B.

As described above, once the reception side PC 102B notifies the transmission source PC 102A of the reception ID, the transmission source PC 102A can specify the reception side PC 102B to transmit data. By repeating the processing in steps S305 to S312, the transmission source PC 102A can transfer data to the reception side PC 102B any number of times. Note that, although not shown, data temporarily saved in the data transfer apparatus 101 may be deleted at an arbitrary timing after a given period of time elapses or the data is transmitted in step S312. Although the transmission source PC and the reception side PC have been individually explained for descriptive convenience, transmission/reception may be executed using a common program. Note that, in FIG. 3, if the reception side PC 102B notifies a plurality of transmission source PCs 102A of the reception ID, data from the plurality of transmission source PCs 102A are temporarily saved in the data transfer apparatus 101 in association with the reception ID. The reception side PC 102B, therefore, wants to discriminate each transmission source PC 102A from which each item of data has been transmitted.

Figure 4:
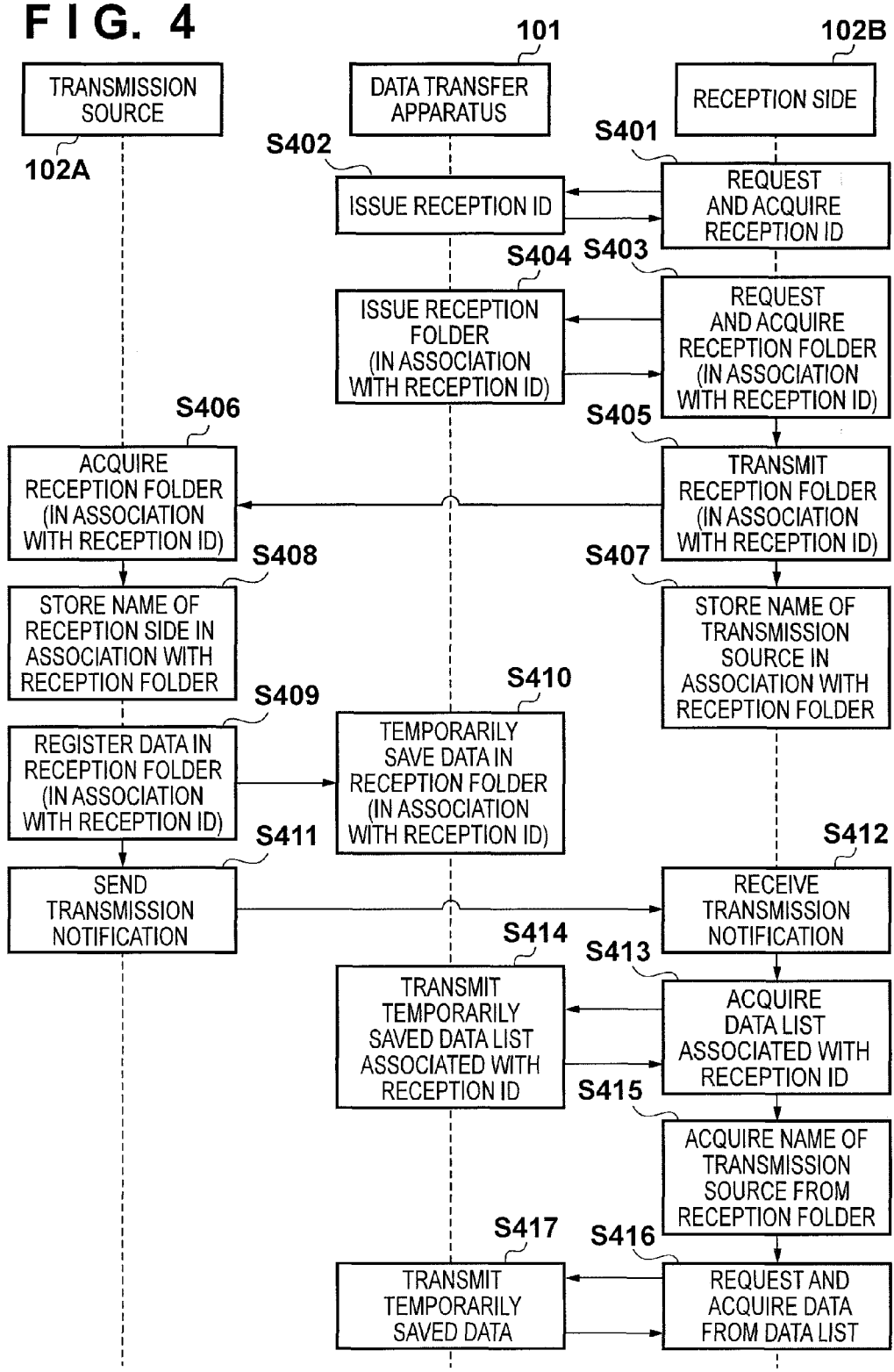
FIG. 4 is a sequence chart for explaining another procedure in the data communication system according to the first embodiment.

FIG. 4 shows an example of a procedure in which the reception side PC 102B can discriminate the transmission source PC 102A in the data communication system according to the first embodiment, unlike the procedure described with reference to FIG. 3.

In step S401, according to an instruction of a program, the CPU 226 of the reception side PC 102B requests the data transfer apparatus 101 to acquire a reception ID. In response to the request, according to an instruction of the transfer manager 106, the CPU 206 of the data transfer apparatus 101 obtains a reception ID unique in the overall system using the DB 107, and returns it to the reception side PC 102B in step S402. The CPU 226 of the reception side PC 102B then receives the reception ID, and saves it as program data in the HDD 229 or the like (step S401). In this way, by assigning the reception ID unique in the overall system to the reception side PC in steps S401 and S402, the data transfer apparatus 101 can systematically manage the data reception side PC 102B. Note that if the reception ID has been stored as program data in the HDD 229 of the reception side PC 102B or the like in advance, steps S401 and S402 can be skipped.

In step S403, according to an instruction of the program, the CPU 226 of the reception side PC 102B requests the data transfer apparatus 101 to acquire a reception folder. Upon receiving the acquisition request, according to an instruction of the transfer manager 106, the CPU 206 of the data transfer apparatus 101 refers to the DB 107, obtains a unique reception folder for each reception ID, and returns it to the reception side PC 102B in association with the reception ID (step S404). Then, in step S403, the reception side PC 102B acquires the requested reception folder (a folder name).

Figure 5:
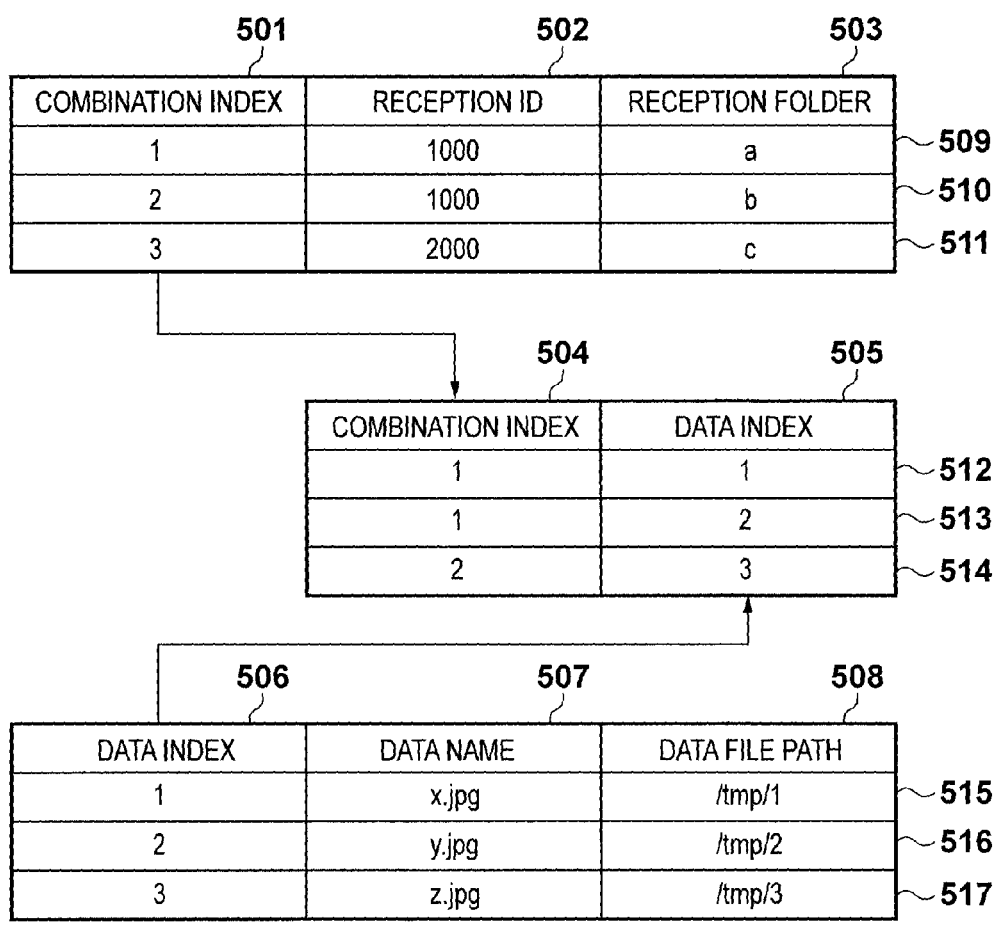
FIG. 5 depicts a view showing an example of data managed by the transfer manager of the data transfer apparatus according to the first embodiment.

At this time, according to an instruction of the transfer manager 106, the CPU 206 of the data transfer apparatus 101 creates a record by combining the reception ID with the reception folder as shown in FIG. 5 in step S404. This record includes an INDEX column 501, a reception ID column 502, and a reception folder column 503.

FIG. 5 depicts a view showing an example of data managed by the transfer manager 106 of the data transfer apparatus 101 according to the embodiment.

The reception folder is represented by a reception folder name which has been issued by the data transfer apparatus 101 in response to a request with the reception ID from the reception side PC 102B. The column 501 indicates INDEX representing a record obtained by combining a reception ID with a reception folder. The column 502 indicates a reception ID. The column 503 indicates a reception folder. Columns 504 and 505 indicate the relationship between temporarily saved data and a combination of a reception ID and a reception folder. A column 506 indicates INDEX representing the record of the temporarily saved data. A column 507 indicates the name of the temporarily saved data. A column 508 indicates the file position (file path) of the temporarily saved data in the data transfer apparatus 101. Although the file position of the temporarily saved data is represented by the file path of the data, the column 508 may hold the data itself.

Records 509 and 510 indicate that reception folders "a" and "b" have been created in a reception side PC with a reception ID "1000", respectively. A record 511 indicates that a reception folder "c" has been created in a reception side PC with a reception ID "2000".

If, for example, the reception folder "a" has been generated for the reception ID "1000", a record like the record 509 is stored in the DB 107. Note that a reception folder is used in combination with a reception ID, and therefore, need only be unique for each reception ID or in the overall system. Although the reception folder is used for descriptive convenience, it is not necessary to generate a physical folder in the data transfer apparatus 101 since the data transfer apparatus 101 need only be able to identify temporarily saved data.

Referring back to FIG. 4, in step S405, according to an instruction of the program, the CPU 226 of the reception side PC 102B notifies the transmission source PC 102A of the reception ID and reception folder acquired in steps S402 and S404. If, at this time, the reception side is at a remote location from the transmission source, according to an instruction of the program, the CPU 226 of the reception side PC 102B displays a screen for setting information to be sent to the transmission source PC 102A and the name of the transmission source PC 102A, and prompts the user of the reception side PC 102B to input them.

In step S406, according to an instruction of the program, the CPU 226 of the transmission source PC 102A acquires the reception ID and reception folder sent in step S405. In step S407, according to an instruction of the program, the CPU 226 of the reception side PC 102B stores, as program data, the name of the transmission source PC 102A in association with the reception folder in the HDD 229 or the like.

FIG. 6 depicts a view illustrating a table showing an example of the structure of management data in the reception side PC 102B according to the embodiment.

The name of the transmission source PC 102A set by the user of the reception side PC 102B is stored in the PC 102B by program B of the reception side in a procedure (to be described later) according to this embodiment. A column 601 indicates a reception folder name. A column 602 indicates a transmission source name corresponding to the reception folder. The transmission source name is arbitrarily set by the user of the reception side PC 102B. A column 603 indicates a reception enable/disable state corresponding to the reception folder. The reception enable/disable state is set by the user of the reception side PC 102B. A column 604 indicates a transmission ID.

In a record 605, for the reception folder "a", "Tom" is set as a transmission source name and "enable" is set as a reception enable/disable state. In a record 606, for the reception folder "b", "Jerry" is set as a transmission source name and "disable" is set as a reception enable/disable state. In a record 607, no reception folder is set, "4000" is set as a transmission ID, "George" is set as a transmission source name, and "enable" is set as a reception enable/disable state. In this way, it is possible to manage a reception folder and a transmission source name in association with each other in the reception side PC 102B.

Referring back to FIG. 4, in step S408, according to an instruction of the program, the CPU 226 of the transmission source PC 102A displays the reception ID, reception folder name, and reception side name on a setting screen. When the user of the transmission source PC 102A inputs a storage instruction, the CPU 226 stores, as management data shown in FIG. 7, the pieces of information in association with each other in the HDD 229 or the like. Then, the process advances to step S409, the CPU 226 of the transmission source PC 102A transmits transmission target data, the reception ID of the reception side, and the reception folder to the data transfer apparatus 101 according to an instruction of the program.

At this time, according to an instruction of the program, the CPU 226 of the transmission source PC 102A displays the management data shown in FIG. 7 by way of example.

FIG. 7 depicts a view illustrating a table showing an example of the structure of management data in the transmission source PC 102A according to the first embodiment. The management data includes a reception ID, a reception folder, and a reception side name arbitrarily set by the user of the transmission source PC 102A.

The reception side name is stored in the PC 102A by the program of the transmission source in a procedure (to be described later) according to this embodiment. A column 701 indicates the reception ID of the reception side PC 102B. A column 702 indicates the reception folder of the reception side PC 102B. A column 703 indicates a reception side name corresponding to the reception ID and reception folder. A record 704 indicates that "Butch" has been set as a reception side name for the reception side PC 102B with the reception ID "1000" and the reception folder "a". A record 705 indicates that "Spike" has been set as a reception side name for the reception side PC 102B with the reception ID "2000" and the reception folder "c". A record 706 indicates that "Tyke" has been set as a reception side name for the reception side PC 102B with the reception ID "3000" and with no reception folder set.

If the reception side PC 102B notifies the transmission source PC 102A of a combination of a reception ID and a reception folder, the sent value is handled as a reception ID without separating it and the reception folder column 702 is set to indicate a reception folder acquired state, thereby enabling discrimination of this case from a case in which no reception folder is set. In this way, it is possible to manage the reception side name set by the user in association with the reception ID and reception folder.

When the user of the transmission source PC 102A sends a data transmission instruction, the CPU 226 of the transmission source PC 102A transmits transmission target data, at least one selected reception ID, and a reception folder to the data transfer apparatus 101 according to an instruction of the program (step S409). If, for example, the reception side name "Butch" is selected to perform transmission, the CPU 226 acquires the reception ID "1000" and the reception folder "a" according to the management data shown in FIG. 7, and transmits them to the data transfer apparatus 101 together with the data.

In step S410, according to an instruction of the transfer manager 106, the CPU 206 of the data transfer apparatus 101 associates the transmission target data with the reception ID and reception folder using the DB 107 to temporarily save the data. If, for example, data "x.jpg" is transmitted from the transmission source PC 102A to the data transfer apparatus 101 together with the reception ID "1000" and the reception folder "a" in step S409, a record 515 of the temporarily saved data, which is formed by the columns 506, 507, and 508 of FIG. 5, is generated as management data. Then, records 512 and 513 for associating INDEX indicating the reception ID "1000" and the reception folder "a" with INDEX of the temporarily saved data are generated as management data.

That is, the data transfer apparatus 101 creates records like the record 515 and a record 516 of FIG. 5. In this case, there are temporarily saved data "x.jpg" and "y.jpg" as data of the reception folder "a" in the reception side PC 102B with the reception ID "1000". Similarly, it is found from records 514 and 517 that there is temporarily saved data "z.jpg" as data of the reception folder "b" in the reception side PC 102B with the reception ID "1000". As described above, a reception ID, reception folder, and temporarily saved data are managed in association with each other. This enables the data transfer apparatus 101 to manage temporarily saved data, a reception ID, and a reception folder in association with each other.

Note that, for descriptive convenience, the transmission source PC 102A transmits a combination of transmission target data and the reception ID and reception folder of the reception side PC 102B for each transmission operation. The PC 102A may cause the data transfer apparatus 101 to issue an identifier such as a folder for each transmission operation, transmit one or a plurality of items of data for the identifier, and transmit a combination of the identifier, a reception ID, and a reception folder at a timing different from the data transmission timing.

Referring back to FIG. 4, in step S411, according to an instruction of the program, the CPU 226 of the transmission source PC 102A notifies the reception side PC 102B of data transmission. In step S412, according to an instruction of the program, the CPU 226 of the reception side PC 102B detects the data transmission notification sent in step S411, and then executes processing in step S413. Note that the data transmission notification from the transmission source PC 102A to the reception side PC 102B may be an email notification using the network 104 or a notification using telephone audio signals. The present invention is not limited to them. If the reception side PC 102B executes the processing in step S413 (to be described later) at regular intervals, the data transmission notification from the transmission source to the reception side is not essential.

In step S413, according to an instruction of the program, the CPU 226 of the reception side PC 102B transmits, to the data transfer apparatus 101 together with a reception ID, a request for a list of data temporarily saved in the data transfer apparatus 101 in association with the reception ID. Upon receiving the list request in step S414, according to an instruction of the transfer manager 106, the CPU 206 of the data transfer apparatus 101 returns, to the reception side PC 102B, a list in which information about data associated with the reception ID received together with the list request is described, among the data temporarily saved in step S410. If, for example, the CPU 226 of the reception side PC 102B requests, of the data transfer apparatus 101, a list of data associated with the reception ID "1000", it is possible to obtain the reception folder column 503 and the data name column 507 based on the reception ID column 502 of FIG. 5. It is found that there are the temporarily saved data "x.jpg" and "y.jpg" in the reception folder "a" and the temporarily saved data "z.jpg" in the reception folder "b" for the reception ID "1000".

A list of the temporarily saved data associated with the reception ID is generated based on the thus obtained information, as shown in FIG. 8.

FIG. 8 depicts a view showing an example of the list of the temporarily saved data associated with the requested reception ID, which has been generated by the data transfer apparatus 101 of the first embodiment.

Reference numerals 801 to 803 denote temporarily saved data associated with the reception ID "1000". The data 801 and 802 form a list of the data associated with the reception folder "a", and the data 803 forms a list of the data associated with the reception folder "b".

As described above, the data transfer apparatus 101 returns, to the reception side PC 102B, the list of the data associated with the reception ID in association with the reception folders. Note that although the data list is represented by a URL including a reception ID, a reception folder, and a data name for descriptive convenience in FIG. 8, the data list may include another element or may have a different form. Furthermore, although a reception ID, a reception folder, and a data name are returned at once, the data transfer apparatus 101 may individually return each element to the reception side PC 102B.

In step S415, according to an instruction of the program, the CPU 226 of the reception side PC 102B acquires information about a transmission source from the data list acquired in step S413 and the management data stored in step S407. As an example, assume that the data list shown in FIG. 8 is acquired in step S413. Since it is found that the data 801 and 802 are associated with the reception folder "a", it is apparent from the record 605 of FIG. 6 that the name of the transmission source of the reception folder "a" is "Tom". Therefore, it is also found that the transmission source "Tom" has transmitted the two data "x.jpg" and "y.jpg" to the data transfer apparatus 101. Similarly, it is apparent from the data 803 of FIG. 8 that a transmission source "Jerry" has transmitted the data "z.jpg" to the data transfer apparatus 101.

Although not shown, it is possible to display based on the acquired information that the transmission sources "Tom" and "Jerry" have transmitted, to the data transfer apparatus 101, the data destined to the user of the reception side PC 102B. Note that when displaying the name of a transmissions source, only the name of the transmission source of data not received by the reception side PC 102B may be displayed. With this processing, the user of the reception side PC 102B can determine only whether to acquire the data not received.

In step S416 of FIG. 4, according to an instruction of the program, the CPU 226 of the reception side PC 102B determines desired acquisition target data based on the data list acquired in step S413 and the management data stored in step S407, and requests it of the data transfer apparatus 101. As an example, assume that the data list shown in FIG. 8 is acquired in step S413. In this case, according to the reception enable/disable state column 603 of FIG. 6, the reception folder "a" has been set to be received and the reception folder "b" has been set not to be received. Therefore, the CPU 226 requests only the data 801 and 802 of the data transfer apparatus 101. This allows reception processing according to a data reception enable/disable state set by the user of the reception side PC 102B.

If a reception folder which is not in the management data stored in step S407 exists in the data list acquired in step S413, it is possible to set not to acquire data in the reception folder.

Upon receiving the data acquisition request sent in step S416, according to an instruction of the transfer manager 106, the CPU 206 of the data transfer apparatus 101 returns designated data to the reception side PC 102B in step S417. As described above, once the reception side notifies the transmission source of the reception ID, the transmission source PC 102A can transfer data to the reception side PC 102B. Therefore, by repeating the processing in steps S409 to S417 of FIG. 4, the transmission source PC 102A can transfer data to the reception side PC 102B any number of times. Note that, although not shown, the data temporarily saved in the data transfer apparatus 101 is deleted at an arbitrary timing after a given period of time elapses or the data is transmitted in step S417.

The data transfer apparatus 101 temporarily saves the data transmitted from the transmission source PC 102A for descriptive convenience. However, whether the reception side PC 102B is active may be determined, and if the reception side PC 102B is active, the transmission source PC 102A may directly transmit the data with reception folder information to the reception side PC 102B.

Figure 9:
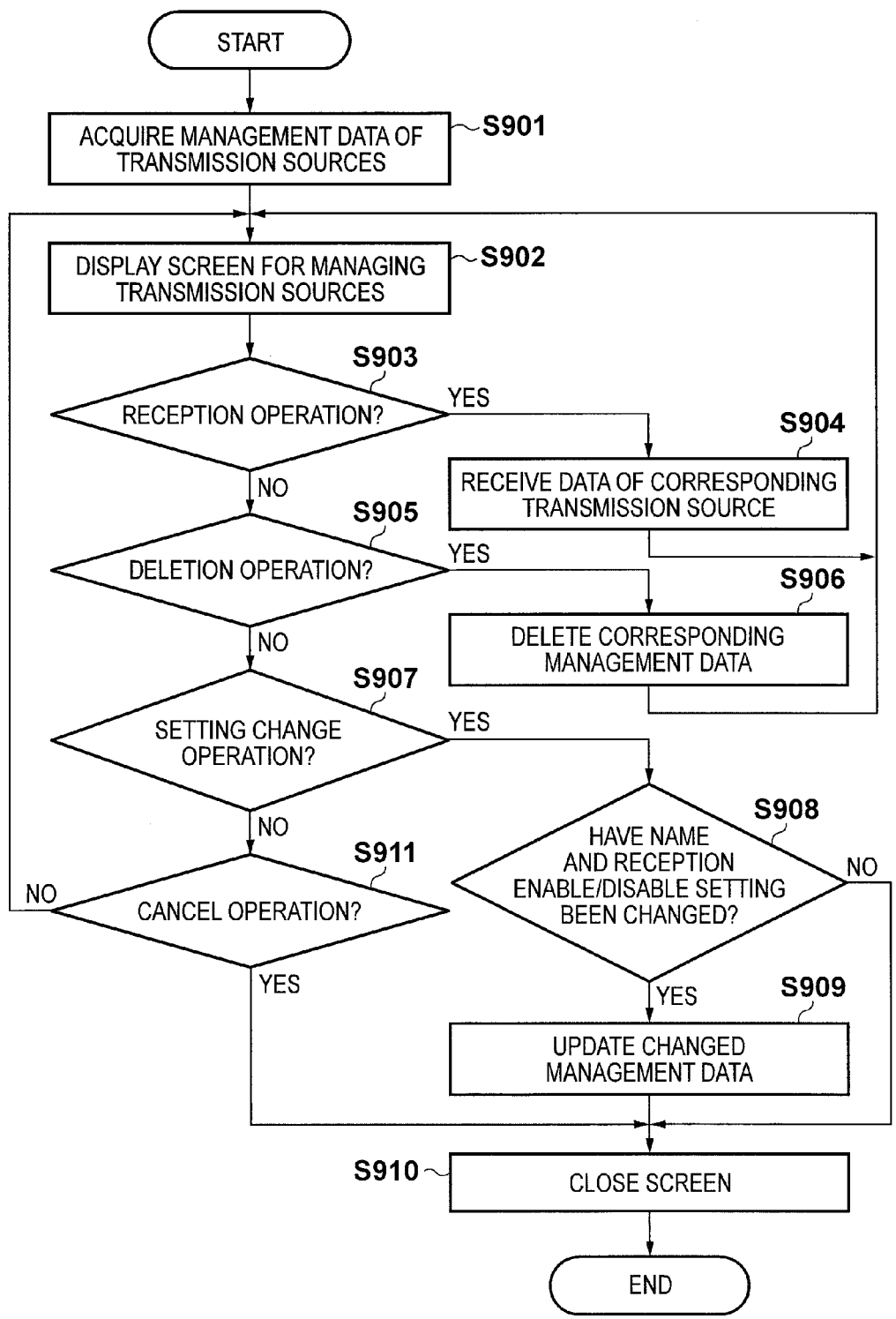
FIG. 9 is a flowchart for describing processing of managing the transmission source PC in the reception side PC according to the first embodiment.

FIG. 9 is a flowchart for describing processing of managing the transmission source PC 102A in the reception side PC 102B according to the first embodiment. This processing serves as, for example, edit processing for the management data shown in FIG. 6, and is implemented by executing, on the CPU 226 of the reception side PC 102B, a program loaded into the RAM 228.

In step S901, according to an instruction of the program, the CPU 226 of the reception side PC 102B acquires management data as shown in FIG. 6 from the program data of the HDD 229. The process then advances to step S902, wherein according to an instruction of the program, the CPU 226 of the reception side PC 102B displays the acquired management data on the display unit 221. The process advances to step S903, and according to an instruction of the program, the CPU 226 of the reception side PC determines, for each transmission source PC 102A, whether a data reception operation is performed. If a reception operation is performed, the process advances to step S904; otherwise, the process advances to step S905. In step S904, according to an instruction of the program, the CPU 226 of the reception side uses the management data to request data of the data transfer apparatus 101, acquires the data, and then returns the process to step S902.

In step S905, according to an instruction of the program, the CPU 226 of the reception side PC determines whether a deletion operation for the management data is performed. If a deletion operation is performed, the process advances to step S906. In step S906, according to an instruction of the program, the CPU 226 of the reception side PC 102B deletes a corresponding record from the management data, and returns the process to step S902 to redisplay a screen for managing transmission sources. If a deletion operation is not performed in step S905, the process advances to step S907, and the CPU 226 of the reception side PC determines, according to an instruction of the program, whether a setting change operation for the management data is performed. If a setting change operation is performed, the process advances to step S908; otherwise, the process advances to step S911. In step S908, according to an instruction of the program, the CPU 226 of the reception side PC 102B checks whether a transmission source name and a reception enable/disable setting have been changed. If they have been changed, the process advances to step S909, and according to an instruction of the program, the CPU 226 of the reception side PC 102B updates the changed transmission source name and reception enable/disable state of the management data, and advances the process to step S910. If the change operation is not performed in step S908 or after the processing in step S909 is executed, the process advances to step S910, and according to an instruction of the program, the CPU 226 of the reception side PC 102B closes the screen for managing the transmission sources, which has been displayed in step S902.

If a setting change operation is not performed in step S907, the process advances to step S911, and the CPU 226 of the reception side PC 102B determines, according to an instruction of the program, whether a setting stop (cancel) operation is performed. If a setting stop (cancel) operation is performed, the process advances to step S910 to close the screen; otherwise, the process returns to step S902 to reflect the operation of, for example, changing the name and display the changed data.

As described above, by providing a mechanism of discriminating the transmission source PC 102A in the reception side PC 102B, the reception side PC 102B can input and display the name of the transmission source PC 102A, and manage the name of the transmission source within the range of the input/output function of the reception side PC 102B.

As shown in the flowchart of FIG. 4, a transmission source name is stored in step S407 before the transmission source PC 102A transmits data to the reception side PC 102B in step S409. It is, therefore, possible to manage a transmission source from which the reception side PC can receive data, as shown in FIGS. 6 and 9, although the reception side PC has not received data from the transmission source.

Figure 10:
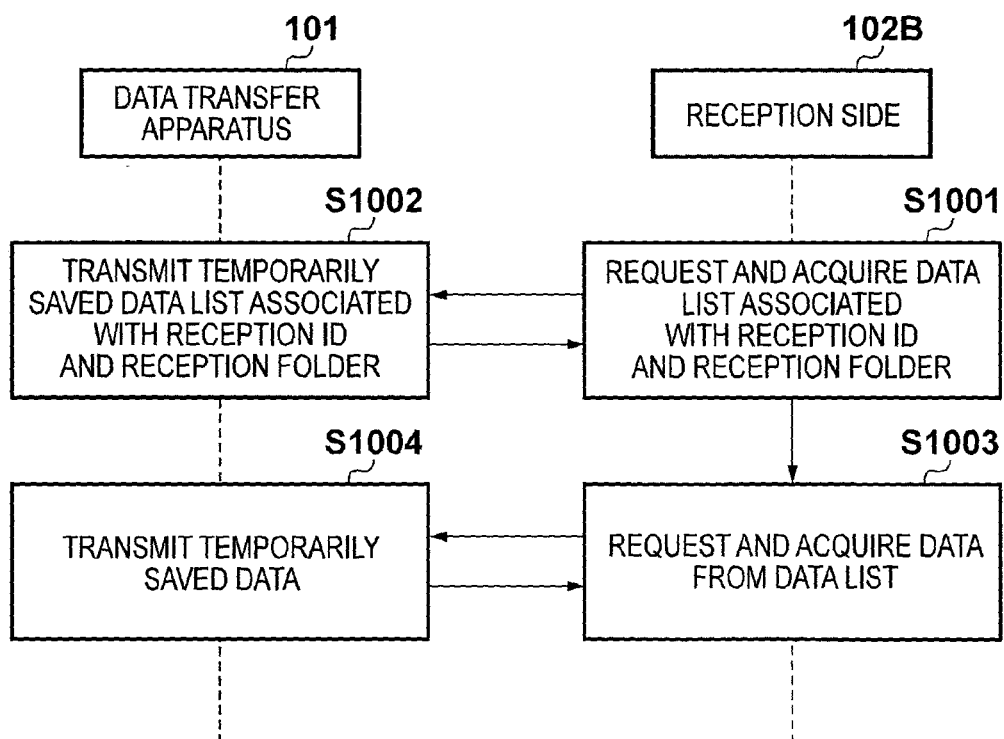
FIG. 10 is a sequence chart showing reception processing for acquiring data from the data transfer apparatus by the reception side PC according to the first embodiment.

FIG. 10 is a sequence chart showing reception processing for acquiring data from the data transfer apparatus 101 by the reception side PC 102B according to this embodiment. Note that this data acquisition processing is executed by, for example, the user operation in step S904 of FIG. 9.

In step S1001, according to an instruction of a program, the CPU 226 of the reception side PC 102B requests the list of the data temporarily saved in the data transfer apparatus 101 in association with the reception ID and reception folder. Assume, for example, that reception from the transmission source "Tom" is instructed. In this case, the reception folder "a" is acquired based on the record 605 with the transmission source name "Tom" of the management data of FIG. 6. Then, the CPU 226 sends a request together with the reception ID "1000" to the data transfer apparatus 101.

In step S1002, the CPU 206 of the data transfer apparatus 101 receives the request sent in step S1001, and transmits, to the reception side, the list of the data, associated with the requested reception ID and the reception folder "a", of the data temporarily saved in step S410 of FIG. 4. If, for example, the CPU 226 requests, of the data transfer apparatus 101, the list of the data associated with the reception ID "1000" and the reception folder "a", it is possible to obtain a reception ID, reception folder, and data name based on the columns 502, 503, and 507 of FIG. 5. Furthermore, it is found that there are the temporarily saved data "x.jpg" and "y.jpg" associated with the reception folder "a" and the reception ID "1000".

Based on the thus obtained information, the CPU 206 of the data transfer apparatus 101 generates a list, as shown in FIG. 8, of the temporarily saved data associated with the reception ID and reception folder.

In step S1003, according to an instruction of the program, the CPU 226 of the reception side requests, of the data transfer apparatus 101, desired data of the data list acquired in step S1001. In step S1004, the CPU 206 of the data transfer apparatus 101 receives the request sent in step S1003, and transmits the designated data to the reception side PC 102B according to an instruction of the transfer manager 106. As described above, the CPU 226 of the reception side can receive the data designated by the user from the transmission source PC 102A by inquiring the data of the data transfer apparatus 101 in step S1003.

Figure 11:
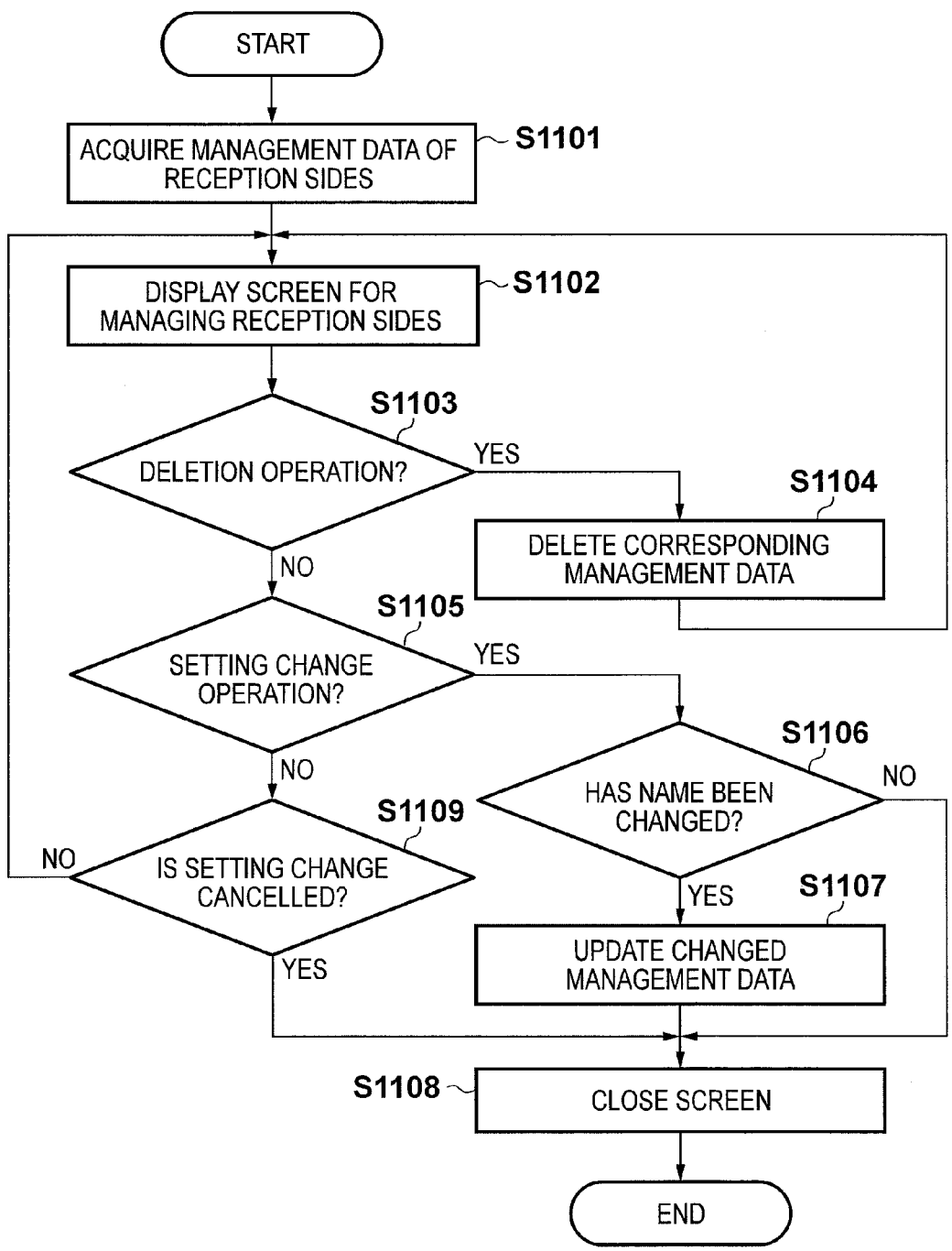
FIG. 11 is a flowchart for describing processing of managing reception sides in the transmission source PC according to the embodiment.

FIG. 11 is a flowchart for describing processing of managing reception sides in the transmission source PC 102A according to the first embodiment. This processing serves as, for example, edit processing for the management data shown in FIG. 7, and is implemented by executing a program loaded into the RAM 228 by the CPU 226 of the transmission source PC 102A.

In step S1101, according to an instruction of the program, the CPU 226 of the transmission source PC 102A acquires management data as shown in FIG. 7 from the program data stored in the HDD 229. In step S1102, according to an instruction of the program, the CPU 226 of the transmission source PC 102A displays the acquired management data on the display unit 221. In step S1103, according to an instruction of the program, the CPU 226 of the transmission source PC 102A determines for each reception side whether a deletion operation for the management data is performed. If a deletion operation is performed, the process advances to step S1104; otherwise, the process advances to step S1105. In step S1104, according to an instruction of the program, the CPU 226 of the transmission source PC 102A deletes an instructed record from the management data, and returns the process to step S1102 to redisplay a screen for managing reception sides. In step S1105, according to an instruction of the program, the CPU 226 of the transmission source PC 102A determines whether a setting change operation for the management data is performed. If a setting change operation is performed, the process advances to step S1106; otherwise, the process advances to step S1109. In step S1106, according to an instruction of the program, the CPU 226 of the transmission source checks whether a reception side name has been changed. If it has been changed, the process advances to step S1107; otherwise, the process advances to step S1108. In step S1107, according to an instruction of the program, the CPU 226 of the transmission source updates the changed reception side name of the management data, and advances the process to step S1108. In step S1108, according to an instruction of the program, the CPU 226 of the transmission source closes the screen for managing the reception sides, which had been displayed in step S1102.

If a setting change operation for the management data is not performed in step S1105, the process advances to step S1109, and the CPU 226 of the transmission source determines, according to an instruction of the program, whether a setting change processing stop (cancel) operation for the management data is performed. If a stop operation is performed, the process advances to step S1108 to close the screen; otherwise, the process returns to step S1102 to reflect the operation of, for example, changing the name and display the changed data.

As described above, since the transmission source PC 102A can input, display, and modify the name of the reception side PC 102B, it is possible to manage the name of the reception side device within the range of the input/output function of the transmission source device.

Modification 1 of First Embodiment

In the first embodiment described above, the data transfer apparatus 101 generates a reception folder as explained in steps S403 and S404 of FIG. 4. Since a reception folder need only be unique for each reception ID, the reception side PC 102B can independently generate a reception folder, and manage it in association with a transmission source name.

An example of a processing procedure when a reception side independently generates a reception folder according to this modification will be described with reference to FIG. 4. Steps S401 and S402 are the same as those in the first embodiment described above.

In step S403, according to an instruction of the program, the CPU 226 of the reception side PC 102B independently generates a reception folder to be unique using the management data of FIG. 6. Step S404 is skipped. Steps S405, S406, S407, S408, and S409 are the same as those in the first embodiment described above.

In response to transmission of data in step S409, the CPU 206 of the data transfer apparatus 101 uses, according to an instruction of the transfer manager 106, the DB 107 to temporarily save the data transmitted from the transmission source PC 102A in association with the reception ID and reception folder in step S410.

At this time, according to an instruction of the transfer manager 106, the CPU 206 of the data transfer apparatus 101 searches the DB 107 for a record obtained by combining a reception ID and reception folder shown in FIG. 5. If there is no such record, the CPU 206 generates management data including the INDEX column 501 indicating a record obtained by combining a reception ID and reception folder, the reception ID column 502, and the reception folder column 503.

If, for example, the data "x.jpg" is transmitted to the data transfer apparatus 101 together with the reception ID "1000" and the reception folder "a", a record as shown in FIG. 5 is generated.

After that, the record 515 of the temporarily saved data including the columns 506 to 508 shown in FIG. 5 is generated as management data. A record such as the record 512 for associating INDEX indicating the reception ID "1000" and reception folder "a" with INDEX of the temporarily saved data is then generated as management data. This allows the data transfer apparatus 101 to manage the temporarily saved data, reception ID, and reception folder in association with each other. Note that steps S411 to S417 are the same as those in the first embodiment described above.

As described above, when the reception side PC 102B notifies the transmission source PC 102A of the reception ID and reception folder in steps S403 to S408, the data transfer apparatus 101 is not required. Even when it is impossible to use the data transfer apparatus 101, therefore, the reception side PC 102B can notify the transmission source PC 102A of the reception folder as long as a transmission ID and reception ID have been acquired in advance.

Modification 2 of First Embodiment

In the first embodiment and its Modification 1 described above, a reception folder is generated for each transmission source, and is managed in association with the name of the transmission source. It is, however, possible to acquire, for each transmission source, a reception ID from the data transfer apparatus 101, and to manage the reception ID in association with the name of the transmission source.

An example of a procedure for transmitting information from a transmission source to a reception side, in which the reception side discriminates the transmission source, when a reception ID and a transmission source name are managed in association with each other according to this modification will be described with reference to FIG. 4.

Steps S401 and S402 are skipped. In steps S403 and S404, the CPU 226 of the reception side PC 102B executes the above-described processing in steps S401 and S402 to acquire the reception ID of each transmission source from the data transfer apparatus 101 instead of a reception folder. In steps S405 to S412, the reception ID of each transmission source is used instead of the reception folder of the first embodiment described above. In steps S413 and S414, the reception ID of each transmission source is used instead of the reception folder of the first embodiment described above, and steps S413 and S414 are executed for each transmission source since the reception ID changes for each transmission source. At this time, instead of repeating steps S413 and S414 for each transmission source, a plurality of reception IDs can be processed at once. In step S415, the CPU 226 of the reception side PC 1023 acquires transmission source information associated with the reception ID being processed from the management data. It is possible to display a transmission source name (not shown) based on the thus obtained transmission source information, and to notify the user of the reception side PC 102B of data transmission. Steps S416 and S417 are the same as those in the first embodiment described above.

As described above, by using a reception ID for each transmission source, it is possible to manage the reception ID in associated with the name of the transmission source.

Second Embodiment

The second embodiment of the present invention will be described. Note that a system configuration and the hardware configuration of a data transfer apparatus 101 and PC 102 (102A or 102B) according to the second embodiment are the same as those in the first embodiment described above, and a description thereof will be omitted.

Figure 12:
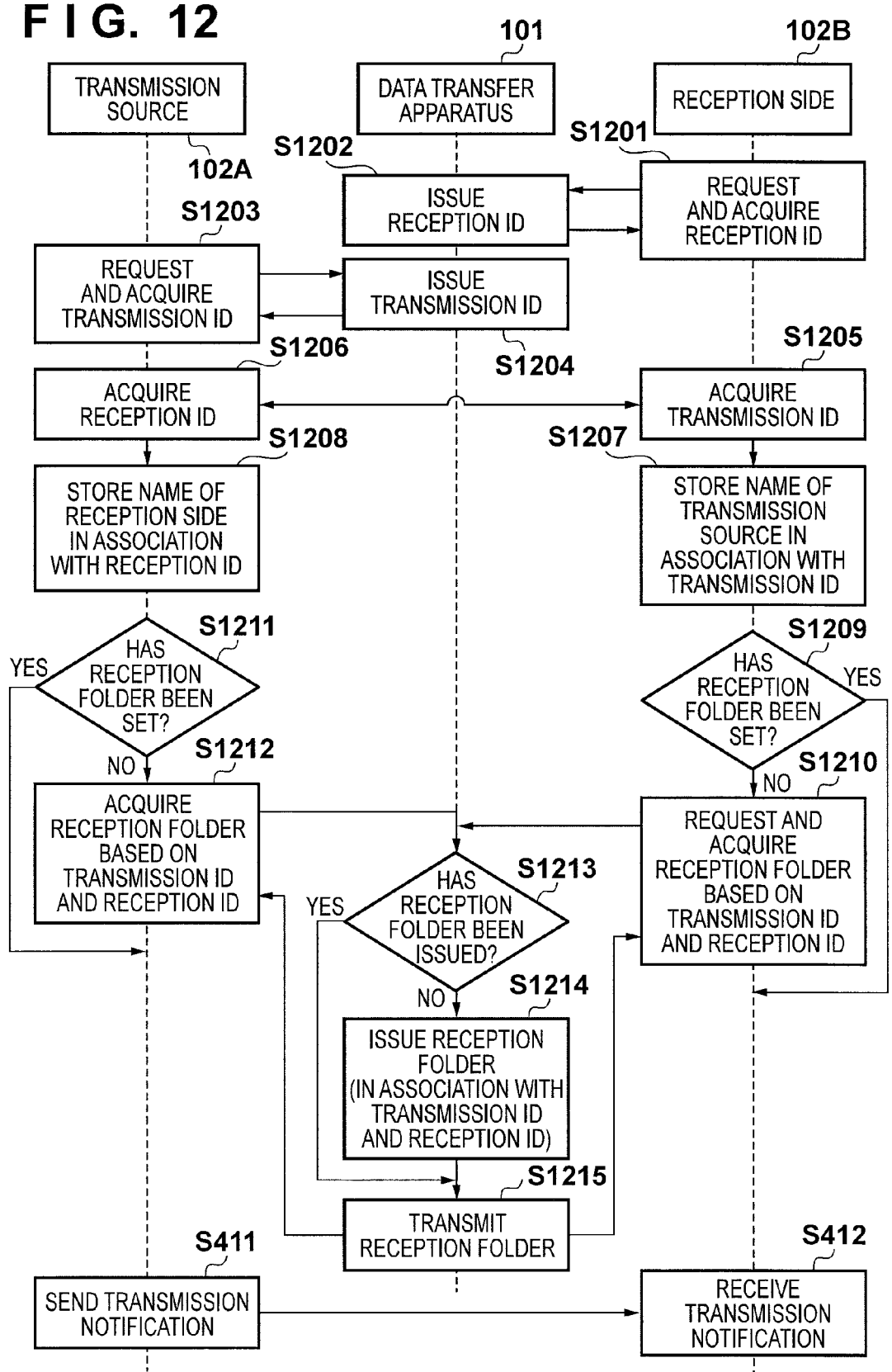
FIG. 12 is a sequence chart for explaining a procedure in a data communication system according to the second embodiment.

FIG. 12 is a sequence chart showing an example of a procedure in which the data transfer apparatus 101 issues a reception folder after the transmission source PC 102A is notified of a reception ID according to the second embodiment of the present invention. This processing is implemented when a CPU 226 of the PC 102A or 102B and a CPU 206 of the data transfer apparatus 101 execute programs loaded in corresponding RAMs, respectively. In FIG. 12, the same parts as in FIG. 4 described above are denoted by the same reference symbols, and a description thereof will be omitted.

In step S1201, according to an instruction of the program, the CPU 226 of the reception side PC 102B requests the data transfer apparatus 101 to acquire a reception ID. In step S1202, the CPU 206 of the data transfer apparatus 101 receives the request, and obtains a reception ID unique in the overall system using a DB 107 to transmit it to the reception side PC 102B according to an instruction of a transfer manager 106. Upon receiving the reception ID, according to an instruction of the program, the CPU 226 of the reception side PC 102B stores the received reception ID as program data in an HDD 229 or the like in step S1201. Note that, although not shown, it is possible to skip the processing in steps S1201 and S1202 when the reception ID has already been stored as program data in the HDD 229 or the like.

Meanwhile, in step S1203, according to an instruction of the program, the CPU 226 of the transmission source PC 102A requests the data transfer apparatus 101 to acquire a transmission ID. In step S1204, the CPU 206 of the data transfer apparatus 101 receives the request, and obtains a transmission ID unique in the overall system using the DB 107 to transmit it to the transmission source PC 102A according to an instruction of the transfer manager 106. Then, the CPU 226 of the transmission source PC 102A receives the transmission ID, and stores the received transmission ID as program data in the HDD 229 or the like according to an instruction of the program. In this way, it is possible to assign a transmission ID unique in the overall system to each transmission source in steps S1203 and S1204, and thus the data transfer apparatus 101 can systematically manage the transmission sources. Note that, although not shown, it is possible to skip steps S1203 and S1204 when the transmission ID has already been stored as program data in the HDD 229 or the like.

In step S1205, according to an instruction of the program, the CPU 226 of the reception side PC 102B notifies the transmission source of the reception ID acquired in step S1201, and acquires the transmission ID from the transmission source. At this time, the CPU 226 of the reception side PC 102B displays a screen including an item in which the name of the transmission source is set. Then, in step S1206, according to an instruction of the program, the CPU 226 of the transmission source PC 102A notifies the reception side PC 102B of the transmission ID issued in step S1204, and acquires the reception ID from the reception side PC 102B. At this time, the CPU 226 of the transmission source PC 102A displays a screen including an item in which the name of the reception side is set.

In step S1207, according to an instruction of the program, the CPU 226 of the reception side PC 102B stores, in association with the transmission ID, the name of the transmission source as program data in the HDD 229 or the like if a user instruction is received. As an example, the CPU 226 generates a record 607 of FIG. 6 using "George" set as the name of the transmission source and the transmission ID "4000" acquired in step S1205, and stores it as program data.

In step S1208, according to an instruction of the program, the CPU 226 of the transmission source PC 102A stores, in association with the reception ID, the name of the reception side PC 102B as program data in the HDD 229 or the like. As an example, when the user sends an instruction to register the name of the reception side, the CPU 226 generates a record 706 of FIG. 7 using "Tyke" set as the name and the reception ID "3000" acquired in step S1206, and stores it as program data.

In step S1209, according to an instruction of the program, the CPU 226 of the reception side PC 102B determines a record, of the management data of the program data, in which no reception folder is set and a transmission ID is set. If no reception folder is set, the process advances to step S1210. Alternatively, if there is no record in which no reception folder is set, the process ends. In step S1210, according to an instruction of the program, the CPU 226 of the reception side PC 102B notifies the data transfer apparatus 101 of the reception ID and transmission ID, and acquires a reception folder. In this example, according to an instruction of the program, the CPU 226 of the reception side PC 102B sets the reception folder returned from the data transfer apparatus 101 in the record in which no reception folder is set, and stores it as program data in the HDD 229 or the like, thereby terminating the process.

In step S1211, according to an instruction of the program, the CPU 226 of the transmission source PC 102A determines a record, of the management data of the program data, in which no reception folder is set. If no reception folder is set, the process advances to step S1212. Alternatively, if there is no record in which no reception folder is set, the process ends. In step S1212, according to an instruction of the program, the CPU 226 of the transmission source PC 102A notifies the data transfer apparatus 101 of the reception ID and transmission ID, and acquires a reception folder. Then, according to an instruction of the program, the CPU 226 of the transmission source PC 102A sets the reception folder returned from the data transfer apparatus 101 in the record in which no reception folder is set, and stores it as program data in the HDD 229 or the like, thereby terminating the process.

Upon receiving a reception folder acquisition request sent in step S1210 or S1212, the CPU 206 of the data transfer apparatus 101 determines in step S1213, according to an instruction of the transfer manager 106, whether there is a reception folder associated with the received reception ID and transmission ID. If there is a reception folder associated with the reception ID and transmission ID, the process advances to step S1215; otherwise, the process advances to step S1214. If, for example, a reception folder associated with the reception ID "3000" and transmission ID "4000" is requested of the data transfer apparatus 101, it is possible to obtain a reception ID column 1301, transmission ID column 1302, and reception folder column 1303 shown in FIG. 13.

FIG. 13 depicts a view illustrating a table showing an example of the structure of the management data in the data transfer apparatus 101, which is used when the data transfer apparatus 101 returns a reception folder in the second embodiment.

The column 1301 indicates a reception ID. The column 1302 indicates a transmission ID. The column 1303 indicates a reception folder corresponding to the reception ID and transmission ID. A record 1304 indicates that a reception folder "e" from a transmission source to a reception side has been set in the reception side with the reception ID "3000" and the transmission source with the transmission ID "4000". That is, it is found that the reception folder "e" has been generated as a reception folder associated with the reception ID "3000" and transmission ID "4000". Note that there is no record if no reception folder has been generated.

In step S1214, the CPU 206 of the data transfer apparatus 101 generates a reception folder associated with the reception ID and transmission ID, and stores information like the record 1304 of FIG. 13 in the DB 107. Note that the processing of generating a reception folder associated with the reception ID is the same as that described in step S404 of FIG. 4.

In steps S1205 to S1208, it is not necessary to acquire the reception ID and transmission ID from the data transfer apparatus 101 by sending these IDs between the reception side PC 102B and the transmission source PC 102A, and the reception side PC 102B and transmission source PC 102A can respectively acquire the reception folder later. Even if it is impossible to use the data transfer apparatus 101 when sending the reception ID and transmission ID between the reception side and the transmission source, it is possible to send the reception folder by acquiring the transmission ID and reception ID in advance.

Modification 1 of Second Embodiment

Although a transmission ID, reception ID, and reception folder are individually generated and managed in the second embodiment, it is also possible to manage a transmission ID, reception ID, and transmission source name in association with each other.

Processing of transmitting information from the transmission source PC 102A to the reception side PC 102B, in which the reception side PC 102B discriminates the transmission source PC 102A, will be described with reference to FIG. 12.

Steps S1201 to S1206 are the same as those in the second embodiment described above. In step S1207, according to an instruction of the program, the CPU 226 of the reception side PC 102B stores, in association with the transmission ID, the name of the transmission source as program data in the HDD 229 or the like. As an example, when the user of the reception side PC 102B sends a registration instruction, the record 607 of FIG. 6 is generated using "George" set as the name and the transmission ID "4000" acquired in step S1205, and is stored as program data.

The transmission ID "4000" is set in the transmission ID column of FIG. 6 in the first embodiment. Since, however, the transmission ID is unique in the overall system, the transmission ID "4000" is set in the reception folder column 601.

In step S1208, according to an instruction of the program, the CPU 226 of the transmission source PC 102A stores, in association with the reception ID, the name of the reception side as program data in the HDD 229 or the like. As an example, when the user of the transmission source PC 102A sends an instruction to register the name of the reception side, the record 706 shown in FIG. 7 is generated using "Tyke" set as the name and the reception ID "3000" acquired in step S1206, and is stored as program data.

In the second embodiment, a reception folder column 702 of FIG. 7 is not set. Since the transmission ID is unique in the overall system, the value "4000" of the transmission ID is set in the reception folder column 702. The processing in steps S1209 to S1215 is not executed. Note that the data transfer apparatus 101 cannot generate a record by combining a reception ID and reception folder prior to data transmission, and therefore, the processing described in step S410 of the first embodiment is executed.

Note that after step S1212, the transmission source PC 102A transmits a transmission notification to the reception side PC 102B in step S411, and the reception side PC 102B receives the transmission notification in step S412. Processing thereafter is the same as that in FIG. 4 described above, and a description thereof will be omitted.

As described above, it is not necessary to generate a reception folder as long as it is possible to acquire a transmission ID by handling the transmission ID like a reception folder.

Third Embodiment

The third embodiment of the present invention will be described. Note that a system configuration and the hardware configuration of a data transfer apparatus 101 and PC 102 (102A or 102B) according to the third embodiment are the same as those in the first embodiment described above, and a description thereof will be omitted.

FIG. 14A depicts a view illustrating a table showing an example of the structure of management data for the reception folder of the reception side PC 102B and a transmission source name set by the user according to the third embodiment.

The transmission source name set by the user is stored in the PC 102B by a program B of the reception side PC 102B in a procedure of the third embodiment (to be described later).

A column 1401 indicates an identifier for associating a transmission source in provisional registration with the transmission source name set by the user. A column 1402 indicates a transmission source name set by the user. A column 1403 indicates a reception enable/disable state set by the user, which corresponds to a reception folder. A column 1404 indicates a transmission ID.

A record 1405 indicates that a transmission source name set by the user for an identifier "a" is "Tom" in a registration state, and a transmission ID is "4000". A record 1406 indicates that a transmission source name set by the user for an identifier "b" is "Jerry" in a provisional registration state. A record 1407 indicates that a transmission source set by the user for an identifier "c" is "George" in a provisional registration state. In this way, it is possible to manage a transmission ID and a transmission source name set by the user in association with each other.

FIG. 14B depicts a view illustrating a table showing an example of the structure of a reception ID and a transmission ID managed in association with an identifier in the data transfer apparatus 101 according to the third embodiment.

A column 1410 indicates a reception ID. A column 1411 indicates an identifier. A column 1412 indicates a transmission ID associated with the reception ID and identifier. A record 1413 indicates that "4000" has been set as a transmission ID for the reception ID "1000" and the identifier "a". A record 1414 indicates that "4100" has been set as a transmission ID for the reception ID "1100" and the identifier "c". A record 1415 indicates that "4200" has been set as a transmission ID for the reception ID "1200" and the identifier "b". In this way, it is possible to manage a transmission ID in association with a reception ID and identifier.

Figure 15:
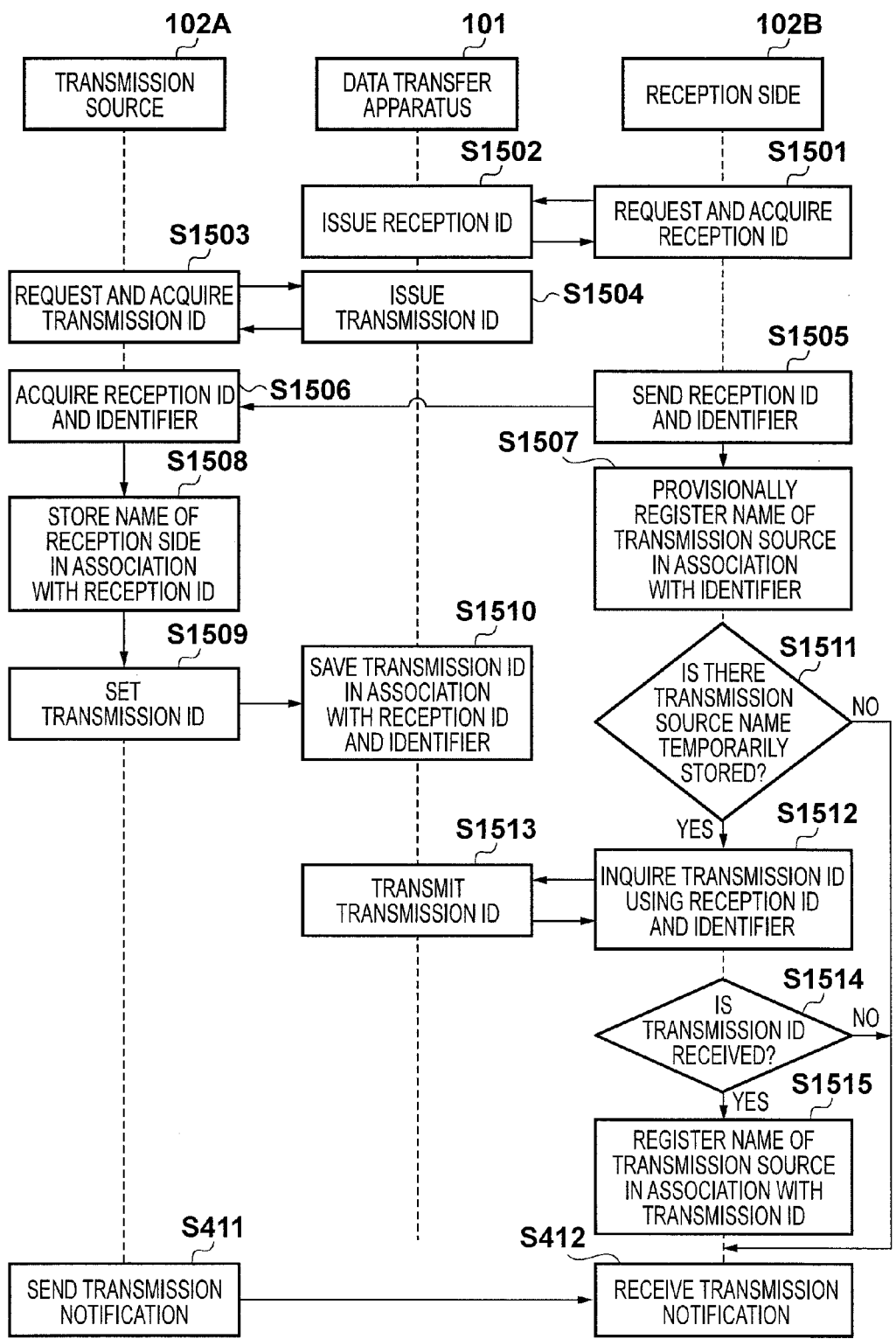
FIG. 15 is a sequence chart for explaining a procedure in a data communication system according to the third embodiment.

FIG. 15 is a sequence chart for explaining a procedure in a data communication system according to the third embodiment. Assume that the reception side PC 102B has a mechanism of associating a transmission ID with a transmission source name set by the user, and the transmission source PC 102A transmits information to the reception side PC 102B.

In step S1501, according to an instruction of the program, a CPU 226 of the reception side PC 102B requests the data transfer apparatus 101 to acquire a reception ID. In step S1502, a CPU 206 of the data transfer apparatus 101 receives the request sent in step S1501, and obtains a reception ID unique in the overall system using a DB 107 to transmit it to the reception side PC 102B according to an instruction of a transfer manager 106. According to an instruction of the program, the CPU 226 of the reception side PC 102B stores the returned reception ID as program data in an HDD 229 or the like in step S1501. Note that, although not shown, it is not necessary to execute steps S1501 and S1502 if the reception ID has already been stored as program data in the HDD 229 or the like.

Meanwhile, in step S1503, according to an instruction of the program, the CPU 226 of the transmission source PC 102A requests the data transfer apparatus 101 to acquire a transmission ID. In step S1504, the CPU 206 of the data transfer apparatus 101 receives the request, and obtains a transmission ID unique in the overall system using the DB 107 to transmit it to the transmission source according to an instruction of the transfer manager 106. According to an instruction of the program, the CPU 226 of the transmission source PC 102A stores the returned transmission ID as program data in the HDD 229 or the like in step S1503. As described above, by assigning a transmission ID unique in the overall system to each transmission source in steps S1503 and S1504, the data transfer apparatus 101 can systematically manage the data transmission sources. Note that, although not shown, it is not necessary to execute steps S1503 and S1504 if the transmission ID has already been stored as program data in the HDD 229 or the like.

In step S1505, according to an instruction of the program, the CPU 226 of the reception side PC 102B generates an identifier necessary for provisional registration, and notifies the transmission source of the generated identifier together with the reception ID acquired in step S1502. Note that the identifier need only be unique on the reception side, and may be generated on the reception side or in the data transfer apparatus 101. At this time, if the reception side is at a remote location from the transmission source, the CPU 226 of the reception side PC 102B displays, according to an instruction of the program, information to be sent to the transmission source and a screen for setting the name of the transmission source. Note that the information to be sent to the transmission source indicates an identifier rather than the above-described reception folder.

In step S1506, according to an instruction of the program, the CPU 226 of the transmission source PC 102A acquires the reception ID and identifier sent in step S1505.

In step S1507, according to an instruction of the program, the CPU 226 of the reception side PC 102B stores, in association with the identifier, the name of the transmission source as program data in a provisional registration state in the HDD 229 or the like. As an example, when the user sends an instruction to register the name of the transmission source, the CPU 226 generates the record 1405 of FIG. 14A using "Tom" set as the name and a corresponding reception folder "a", and stores it as program data.

In step S1508, according to an instruction of the program, the CPU 226 of the transmission source PC 102A displays the name of the reception side and the reception ID on a setting screen, and stores them as program data in the HDD 229. In step S1509, according to an instruction of the program, the CPU 226 of the transmission source PC 102A transmits a transmission ID in association with the sent reception ID and identifier to the data transfer apparatus 101. In step S1510, the CPU 206 of the data transfer apparatus 101 receives the request sent in step S1509, and temporarily saves the transmission ID in association with the reception ID and identifier using the DB 107 according to an instruction of the transfer manager 106. If, for example, a transmission ID is "4000" for the reception ID "1000" and the identifier "a", a record such as the record 1413 of FIG. 14B is generated as management data. Note that, although not shown, the temporarily saved transmission ID may be deleted after it is returned in response to an inquiry from the reception side (to be described later) or after a given period of time elapses.

In step S1511, according to an instruction of the program, the CPU 226 of the reception side PC 102B determines, when a notification of data transmission is received from the transmission source or at regular intervals, whether there is a transmission source name in a provisional registration state. If there is a transmission source name in a provisional registration state, the process advances to step S1512; otherwise, the process ends.

If, for example, there is a record such as the records 1406 and 1407 of FIG. 14A in which no transmission ID is set, it is determined that there is a transmission source name in a provisional registration state.

In step S1512, according to an instruction of the program, the CPU 226 of the reception side PC 102B requests the data transfer apparatus 101 to check a transmission ID using a pair of the reception ID and the identifier for which a transmission source name is in a provisional registration state. In step S1513, based on the requested reception ID and identifier, the CPU 206 of the data transfer apparatus 101 returns the transmission ID temporarily saved in step S1510. In step S1514, according to an instruction of the program, the CPU 226 of the reception side PC 102B determines whether there is a transmission ID corresponding to the identifier acquired in step S1513. If there is a transmission ID corresponding to the identifier, the process advances to step S1515; otherwise, the process ends. In step S1515, according to an instruction of the program, the CPU 226 of the reception side PC 102B sets the transmission ID corresponding to the identifier in the management data of the transmission source name, changes the provisional registration state to a registration state, and then ends the process. As indicated by the record 1405 of FIG. 14A, for example, the provisional registration state is changed to a registration state by setting the transmission ID.

It is possible to process data transmission/reception in steps S409 to S417 of FIG. 4 in the same manner by replacing a reception folder in the first embodiment described above with a transmission ID. This enables management of transmission source names on the reception side without using a reception folder.

Note that after step S1509, the transmission source PC 102A transmits a transmission notification to the reception side PC 102B in step S411, and the reception side PC 102B receives the transmission notification in step S412. Processing thereafter is the same as that in FIG. 4 described above, and a description thereof will be omitted.

Fourth Embodiment

The fourth embodiment of the present invention will be described. Note that a system configuration and the hardware configuration of a data transfer apparatus 101 and PC 102 (102A or 102B) according to the fourth embodiment are the same as those in the first embodiment described above, and a description thereof will be omitted. The fourth embodiment has been made in consideration of a case in which the number of characters (digits) representing a code indicating a reception ID or transmission ID is too large in the above-described embodiments, and it is therefore difficult for the user to communicate the code using audio signals by telephone or the like, or by inputting the code. The fourth embodiment has as its objective to adjust the number of characters in the code depending on a code issuance status, an operation status, or a use.

Figure 16A:
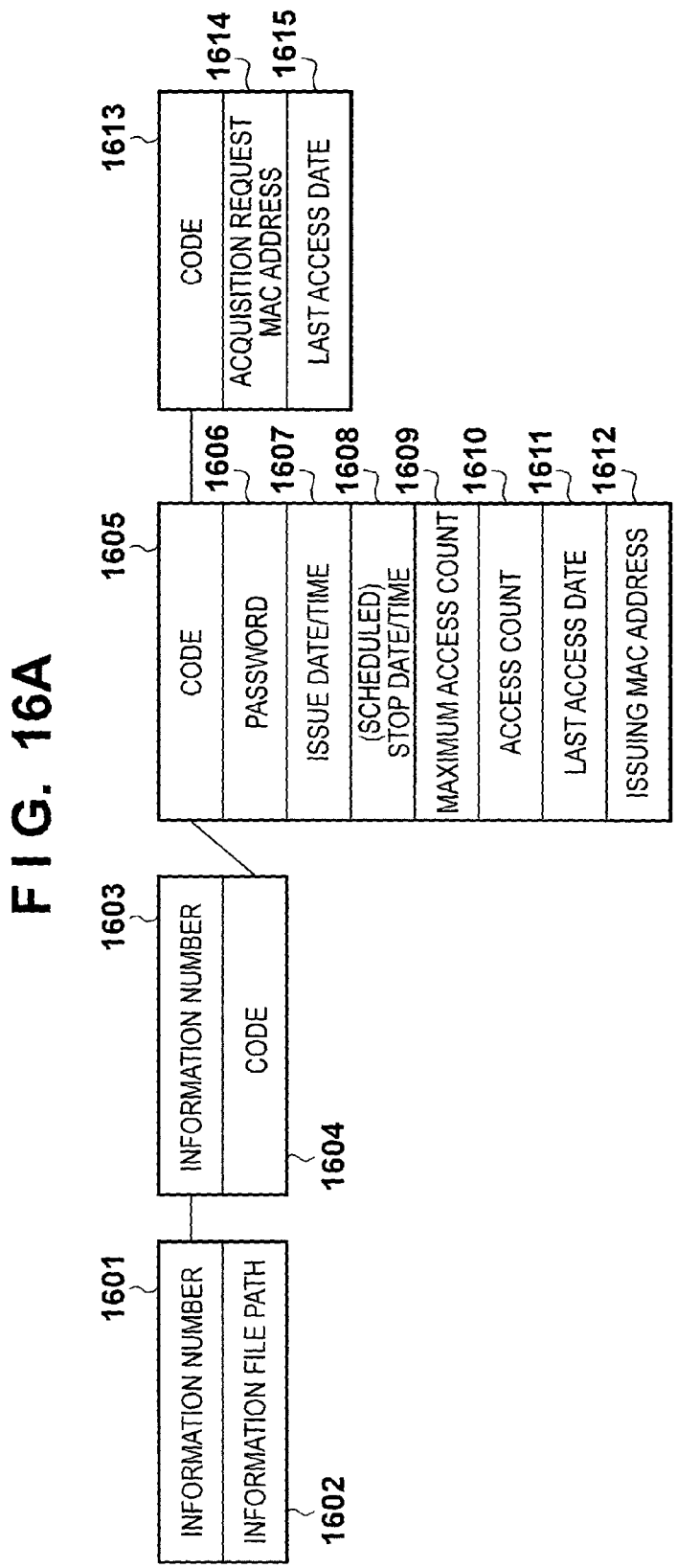
FIG. 16A depicts a view showing an example of management data associated with a code to be issued according to the fourth embodiment.
Figure 16B:
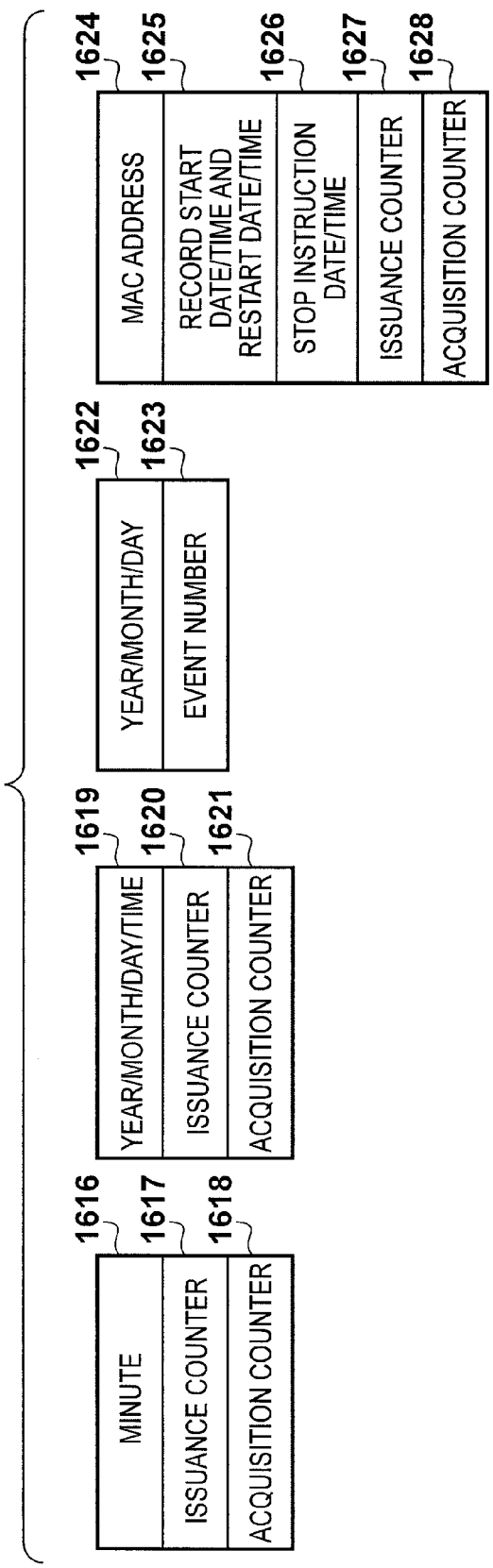
FIG. 16B depicts a view showing an example of management data to be used to issue a code.

FIGS. 16A and 16B depict views each showing an example of management data used in the data transfer apparatus 101 of the fourth embodiment.

FIG. 16A depicts a view showing an example of management data associated with a code to be issued by the data transfer apparatus 101. FIG. 16B depicts a view showing an example of management data to be used to issue a code.

An information number field 1601 indicates a number which is issued to be unique in the data transfer apparatus 101 for information received and stored by the data transfer apparatus 101 and is used to manage the information. A field 1602 indicates the file path of the information received and stored by the data transfer apparatus 101. Although the information is managed using the file path in the fourth embodiment, the information itself may be directly handled instead of the file path. An information number field 1603 indicates an information number associated with a code field 1604. The code field 1604 is associated with the information number. A code field 1605 indicates a code used by the user to acquire the information received and stored by the data transfer apparatus 101. A password field 1606 is set with a password if the password is added when the user temporarily saves the information in the data transfer apparatus 101. This password is used when the user acquires the information from the data transfer apparatus 101. If the password is incorrect, the user cannot acquire the temporarily saved information. An issue date/time field 1607 indicates a date/time when the data transfer apparatus 101 issues the code of the code field 1605. A scheduled stop date/time field 1608 indicates a date/time obtained by adding a period during which the code of the code field 1605 is valid to the date/time when the code is issued. If, for example, the code is issued at 0:0:0 on Jan. 1, 2010, and is valid for 24 hours, 0:0:0 on Jan. 2, 2010 is set as a scheduled stop date/time. Note that since the issue date/time field 1607 is held, the period of validity of the code may be held instead of the stop date/time.

A maximum access count field 1609 is set with a maximum number of times it is possible to request to acquire the information after the data transfer apparatus 101 issues the code. For example, for a code which intends to be used only once, "1" is set. An access count field 1610 is used to count the number of times information acquisition is requested after the data transfer apparatus 101 issues the code. In this example, when information acquisition is requested, the value of the field 1610 is counted up and set, regardless of the validity/invalidity, the period of validity, and the maximum access count. A last access date field 1611 indicates a last date/time when information acquisition is requested, and is set with a date/time when information acquisition is requested, regardless of the validity/invalidity, the period of validity, and the maximum access count. An issuing MAC address field 1612 is set with the MAC address of an information processing apparatus (PC) which has issued the code received and stored by the data transfer apparatus 101.

By holding these data, it is possible to return the same code when it is confirmed that the code received by the data transfer apparatus 101 is the same as the temporarily stored code and that the information processing apparatus (PC) which has sent the code to the data transfer apparatus 101 is the same as that which has sent the temporarily stored information. Note that the value of the maximum access count field 1609 may be incremented to adjust the number of acquisition operations.

A code field 1613 is associated with the code field 1605. An acquisition request MAC address field 1614 is set with the MAC address of each information processing apparatus (PC) which has requested to acquire information. A last access date field 1615 is set, for each information processing apparatus which has requested to acquire information, with a last date/time when information acquisition request is sent, regardless of the validity/invalidity, the period of validity, and the maximum access count. By having data like the fields 1613 to 1615, it is possible to specify, for each code, the last access date and the information processing apparatus which has acquired information. Even if, for example, an information processing apparatus (PC) which has acquired information using a given code requests to acquire information using the same code again, it is possible to control to, for example, restrict information acquisition for a given period of time.

With this operation, for a code reused by the data transfer apparatus 101, it is possible to prevent a user who holds a code that he/she used before from acquiring information based on the code.

A minute field 1616 of FIG. 16B indicates the minute for which the number of code issuance requests and the number of acquisition requests for each minute for the data transfer apparatus 101 must be managed. An issuance counter field 1617 indicates the number of code issuance requests for each minute for the data transfer apparatus 101. An acquisition counter field 1618 indicates the number of acquisition requests for each minute for the data transfer apparatus 101. A year/month/day/time field 1619 indicates year/month/day information for which the number of code issuance requests and the number of acquisition requests for each year/month/day for the data transfer apparatus 101 must be managed. An issuance counter field 1620 indicates the number of code issuance requests for each year/month/day for the data transfer apparatus 101. An acquisition counter field 1621 indicates the number of acquisition requests for each year/month/day for the data transfer apparatus 101. Data in the fields 1620 and 1621 is formed by adding up, every hour, the numbers of code issuance requests and the numbers of acquisition requests for respective minutes to get the number of issuance requests and the number of acquisition requests for each year/month/day.

A year/month/day field 1622 is set with the year/month/day of an event associated with the release date of a PC using the data transfer apparatus 101 or the like. An event number field 1623 is set with an event number indicating an event associated with the release date of a PC using the data transfer apparatus 101 or the like. Note that, although not shown, the event number is associated with details of the event. A MAC address field 1624 is set with the MAC address of a PC which has sent a code issuance request or acquisition request to the data transfer apparatus 101. A record start date/time and restart date/time field 1625 is set, for each MAC address, with a date/time when recording starts or acceptance of processing successfully restarts. A stop instruction date/time field 1626 is set, for each MAC address, with a date/time when it is instructed not to process an issuance request and acquisition request from the MAC address. An issuance counter field 1627 is set, for each MAC address, with the number of issuance requests after the date/time when recording starts or acceptance of processing successfully restarts, or the date/time when it is instructed not to process an issuance request and acquisition request, regardless of whether processing is successfully executed. An acquisition counter field 1628 is set, for each MAC address, with the number of acquisition requests after the date/time when recording starts or acceptance of processing successfully restarts, or the date/time when it is instructed not to process an issuance request and acquisition request, regardless of whether processing is successfully executed.

By having data like the fields 1624 to 1628, it is possible to control an issuance request and acquisition request of each PC. Even if, for example, an issuance request from a given PC is accepted after the number of requests per unit time exceeds a threshold, it is possible to stop temporary storage of information and code issuance for a given period of time. Similarly, even if an acquisition request from a given PC is accepted after the number of requests per unit time exceeds a threshold, it is possible to control not to return information for a given period of time. This enables dealing with unauthorized access.

FIGS. 17A through 17D show a flowchart for describing processing of obtaining the number of code characters in issuing a code in the data transfer apparatus 101 according to the fourth embodiment. Note that a program for executing this processing is loaded into a RAM 208 in execution, and is executed under the control of a CPU 206.

In step S1701, the CPU 206 initially sets "3" in a variable digit (stored in the RAM 208) as the number of characters. Note that although the initial value is assumed to be "3" for descriptive convenience, it need only be a natural number. In step S1702, the CPU 206 determines whether a password is given. If a password is given, the process advances to step S1744 (FIG. 17D); otherwise, the process advances to step S1703. This can eliminate the need to adjust the number of characters when a password is given to protect the code. Note that, although not shown, if a password is given, there is an unissued code and the number of characters, which is larger than an arbitrary predetermined number of characters, may be acquired. If no password is given, the CPU 206 determines a temporarily stored information acquisition enable count in step S1703. If the information acquisition enable count is one, the process advances to step S1705; otherwise, the process advances to step S1704. In step S1704, the CPU 206 adds the temporarily stored information acquisition enable count to the variable digit. This enables adjustment of the number of characters when it is possible to acquire the temporarily stored information a plurality of times. Although the temporarily stored information acquisition enable count is added without any change for descriptive convenience, it may be possible to calculate, based on the information acquisition enable count by another method using a function or the like, a value to be added. Although not shown, if the acquisition enable count is unlimited, a maximum number of characters is set.

In step S1705, the CPU 206 determines a temporarily stored information acquisition enable time. If the information acquisition enable time is shorter than eight hours, the process advances to step S1707; otherwise, the process advances to step S1706. In step S1706, the CPU 206 adds, to the variable digit, the quotient obtained by dividing the temporarily stored information acquisition enable time by eight, then advances to step S1707. This enables adjustment of the number of characters when the temporarily stored information acquisition enable time is long. Note that although the quotient obtained by dividing the temporarily stored information acquisition enable time by a constant is added, it may be possible to calculate, based on the acquisition enable time by another method using a function or the like, a value to be added. Furthermore, although a value of eight hours is used as a determination criterion, an arbitrary constant may be used. Although not shown, if the acquisition enable time is unlimited, the maximum number of characters is set.

In step S1707, the CPU 206 acquires the number of issued codes each having the number of characters smaller than the value of the variable digit. The number of issued codes will be described using the management data shown in FIG. 16A. The number of issued codes is equal to that of data when the number of characters in the code field 1605 is smaller than the value of the variable digit, the value of the scheduled stop date/time field 1608 is later than the current date/time, and the value of the access count field 1610 is smaller than that of the maximum access count field 1609. The process advances to step S1708, and the CPU 206 compares the number of unissued codes with that of issued codes each having a predetermined number of characters (digits), which has been acquired in step S1707. If the number of issued codes is equal to or larger than 1/5 of the number of unissued codes, the process advances to step S1709; otherwise, the process advances to step S1710. When the variable digit is "3", the total number of codes each of which can be formed by a three-digit number is 1000, thereby enabling easy calculation of the number of unissued codes. In step S1709, the CPU 206 increments the variable digit by one, and returns the process to step S1707. This enables adjustment of the number of characters according to the ratio between the number of issued codes and that of unissued codes. Although the ratio between the number of issued codes and that of unissued codes is 1/5 for descriptive convenience, another method using a function or the like in which, if the number of characters is small, the ratio of the number of issued codes to that of unissued codes is set to be small may be used.

In step S1710, the CPU 206 checks the distribution of issued codes. If the distribution is biased by a predetermined value or larger, the process advances to step S1711; otherwise, the process advances to step S1712. Assume that the variable digit is "5". In this case, the distribution of issued codes is checked with respect to two, three, four, or five characters. Using the management data shown in FIG. 16A, a frequency distribution is obtained for each number of characters using the code field 1605, and it is determined whether a predetermined value for each number of characters is exceeded, thereby enabling checking of the distribution of issued codes. Although the distribution is checked using a frequency distribution and a predetermined value for each number of characters, another distribution check method may be used. In step S1711, the CPU 206 increments the variable digit by one, and advances the process to step S1712. This enables adjustment of the number of characters when the distribution of issued codes is biased.

Figure 17A:
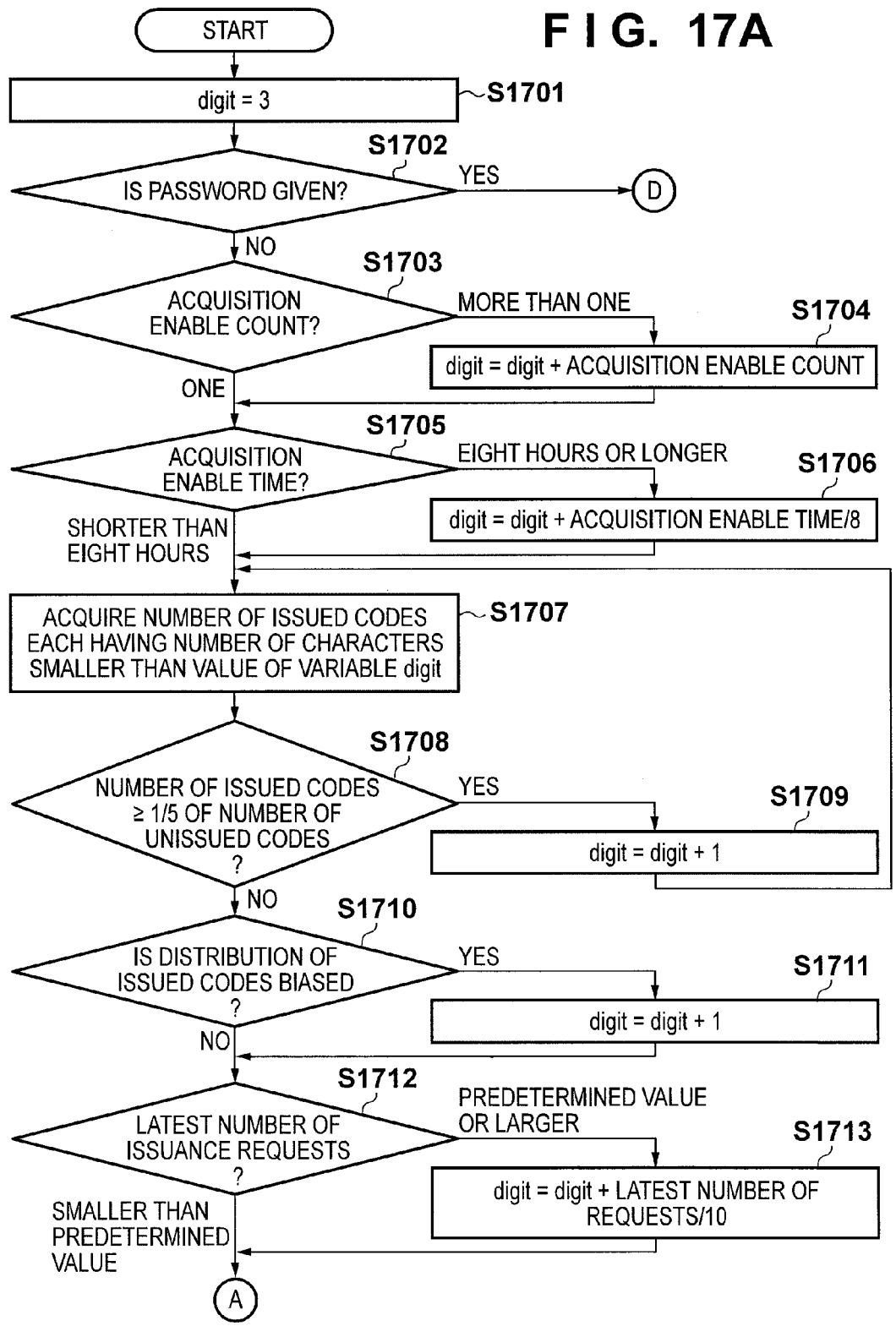
Figure 17B:
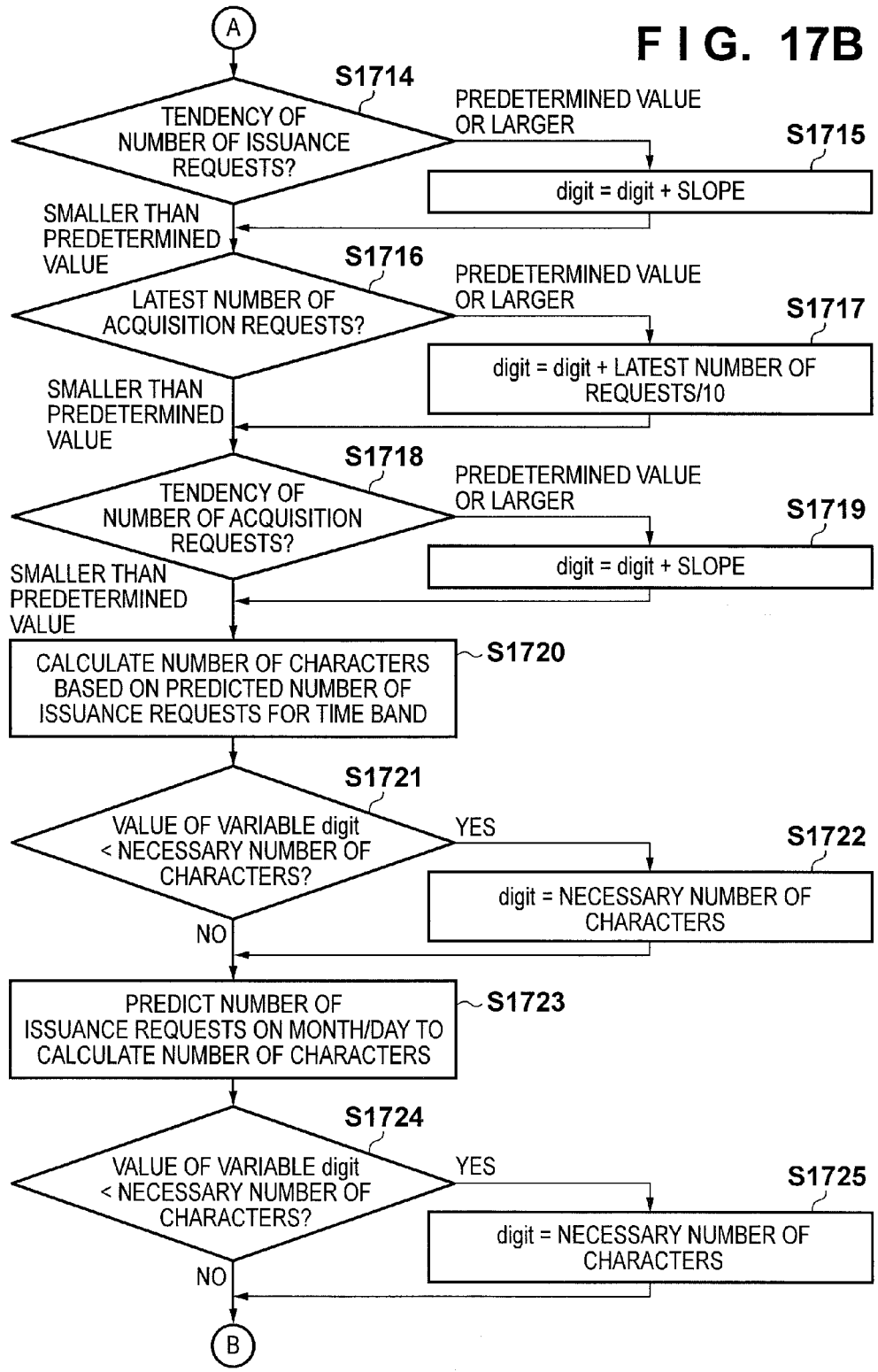

In step S1712, the CPU 206 checks the latest number of issuance requests. If the number of issuance requests is equal to or larger than a predetermined value, the process advances to step S1713; otherwise, the process advances to step S1714 (FIG. 17B). Using the management data shown in FIG. 16B, it is possible to obtain the latest number of issuance requests by obtaining the minute nearest to the current time, and acquiring the value of the issuance counter field 1617 based on the value of the minute field 1616. Assume, for example, that the value of the minute field 1616 is generated every minute from midnight (00:00) every day. In this case, when the current time is one after one (01:01), an issuance request count at one after one need only be acquired based on "one o'clock" nearest to the current time, that is, the issuance counter field 1617 need only be acquired from a record in which the minute field 1616 has "60". In step S1713, the CPU 206 adds 1/10 of the latest issuance request count to the variable digit, and advances the process to step S1714 (FIG. 17B). Note that 1/10 of the latest issuance request count is added for descriptive convenience. A value to be added, however, may be calculated based on the latest issuance request count by another method using a function or the like. This enables adjustment of the number of characters based on the latest number of issued codes.

In step S1714, the CPU 206 checks the tendency of the number of issuance requests. If the number of issuance requests tends to increase, the process advances to step S1715; otherwise, the process advances to step S1716. Using the management data shown in FIG. 16B, it is possible to obtain the tendency of the number of issuance requests for the past several hours using a linear approximation or approximation curve based on the minute field 1616 and issuance counter field 1617. For example, the tendency during the past hour is calculated using linear approximation, and whether the slope shows an increase is determined. In step S1715, the CPU 206 adds the slope calculated using linear approximation to the variable digit intact, and advances the process to step S1716. Note that although the slope is calculated using linear approximation for the past hour and the calculated slope is added, the number of requests in the next time may be predicted using an approximation curve and the predicted number may be added to the variable digit. This enables adjustment of the number of characters according to the code issuance tendency.

In step S1716, the CPU 206 checks the latest number of acquisition requests. If the number of acquisition requests is equal to or larger than a predetermined value, the process advances to step S1717; otherwise, the process advances to step S1718. Using the management data shown in FIG. 16B, it is possible to obtain the latest number of acquisition requests by obtaining the minute nearest to the current time and acquiring the value of the acquisition counter field 1618 based on the value of the minute field 1616. Assume, for example, that the value of the minute field 1616 is generated every minute from midnight (00:00) every day. In this case, when the current time is one after one (01:01), an acquisition request count at one after one need only be acquired based on "one o'clock" nearest to the current time, that is, the acquisition counter field 1618 need only be acquired from a record in which the minute field 1616 has "60". In step S1717, the CPU 206 adds 1/10 of the latest acquisition request count to the variable digit, and advances the process to step S1718. Note that although 1/10 of the latest acquisition request count is added, a value to be added may be calculated based on the latest acquisition request count by another method using a function or the like. This enables adjustment of the number of characters based on the latest number of acquisition requests.

In step S1718, the CPU 206 checks the tendency of the number of acquisition requests. If the number of acquisition requests tends to increase, the process advances to step S1719; otherwise, the process advances to step S1720. Using the management data shown in FIG. 16B, it is possible to obtain the tendency of the number of acquisition requests for the past several hours using a linear approximation or approximation curve based on the minute field 1616 and acquisition counter field 1618. For example, the tendency during the past hour is calculated using linear approximation, and whether the slope shows an increase is determined. In step S1719, the CPU 206 adds the slope calculated using linear approximation to the variable digit intact, and advances the process to step S1720. Note that although the slope is calculated using linear approximation for the past hour and the calculated slope is added, the number of requests in the next time band may be predicted using an approximation curve and the predicted number may be added to the variable digit. This enables adjustment of the number of characters according to the tendency of the number of acquisition requests.

In step S1720, the CPU 206 predicts the number of issuance requests for the current time band, calculates the number of characters based on the predicted number of issuance requests, and then advances the process to step S1721. Using the management data shown in FIG. 16B, it is possible to obtain the predicted number of issuance requests by obtaining the past tendency for one day using a linear approximation or approximation curve based on the year/month/day/time field 1619 and the issuance counter field 1620. At this time, for example, based on a predicted number of requests and an actual number of requests during a previous time band, the past tendency may be corrected to conform to the actual number of requests.

In step S1721, the CPU 206 compares the value of the variable digit with the number of characters calculated in step S1720. If the value of the variable digit is smaller than the calculated number of characters, the process advances to step S1722; otherwise, the process advances to step S1723. In step S1722, the CPU 206 sets the number of characters calculated in step S1720 in the variable digit, and then advances the process to step S1723. This enables adjustment of the number of characters according to the tendency of the number of issuance requests during a given time band.

Figure 17C:
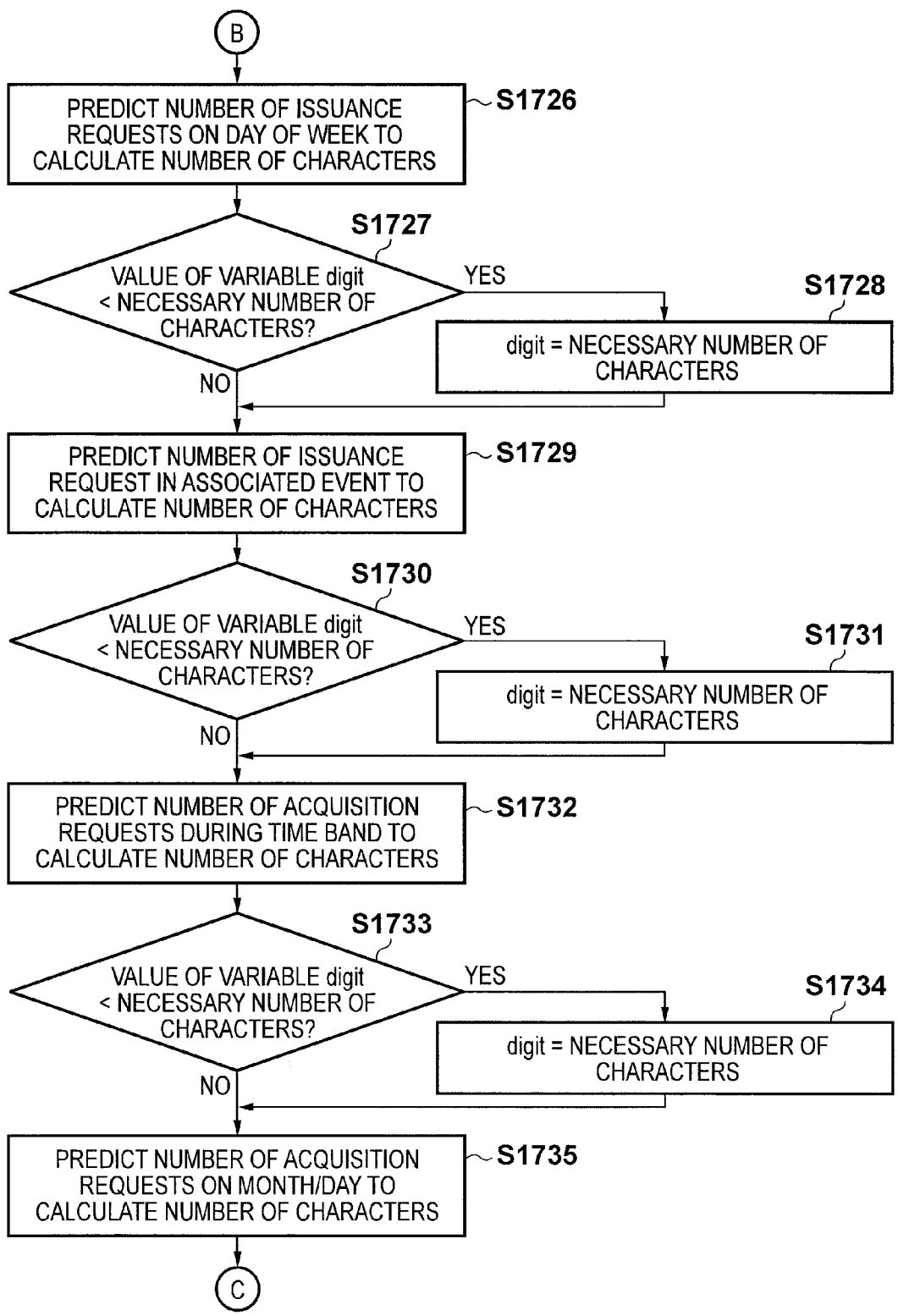

In step S1723, the CPU 206 predicts the number of issuance requests on the current month/day, calculates the number of characters based on the predicted number of issuance requests, and then advances the process to step S1724. Using the management data shown in FIG. 16B, it is possible to predict the number of issuance requests by obtaining the past tendency for one day using a linear approximation or approximation curve based on the year/month/day/time field 1619 and the issuance counter field 1620. At this time, for example, based on a predicted number of requests and an actual number of requests on the previous day, the past tendency may be corrected to conform to the actual number of requests. In step S1724, the CPU 206 compares the value of the variable digit with the number of characters calculated in step S1723. If the value of the variable digit is smaller than the calculated number of characters, the process advances to step S1725; otherwise, the process advances to step S1726 (FIG. 17C). In step S1725, the CPU 206 sets the number of characters calculated in step S1723 in the variable digit, and advances the process to step S1726. This enables adjustment of the number of characters according to the tendency of the number of issuance requests for each day of each month.

In step S1726 of FIG. 17C, the CPU 206 predicts the number of issuance requests on the current day of the week, calculates the number of characters based on the predicted number of issuance requests, and then advances the process to step S1727. Using the management data shown in FIG. 16B, it is possible to predict the number of issuance requests by obtaining the past tendency for each day of the week using a linear approximation or approximation curve based on the year/month/day/time field 1619 and the issuance counter field 1620. At this time, for example, based on a predicted number of requests and an actual number of requests on the same day of the last week, the past tendency may be corrected to conform to the actual number of requests.

In step S1727, the CPU 206 compares the value of the variable digit with the number of characters calculated in step S1726. If the value of the variable digit is smaller than the calculated number of characters, the process advances to step S1728; otherwise, the process advances to step S1729. In step S1728, the CPU 206 sets the number of characters calculated in step S1726 in the variable digit, and advances the process to step S1729. This enables adjustment of the number of characters according to the tendency of the number of issuance requests for each day of the week.

In step S1729, the CPU 206 obtains a registered event within a range of 30 days before and after the current month/day, predicts the number of issuance requests in the same event in the past, calculates the number of characters based on the predicted number of issuance requests, and then advances the process to step S1730. Using the management data shown in FIG. 16B, it is possible to obtain the registered event by obtaining the event number field 1623 associated with the current month/day based on the year/month/day field 1622. Using the management data shown in FIG. 16B, it is possible to acquire a list of year/month/day information of the same event in the past by obtaining the year/month/day field 1622 with the same event number as the previously obtained value of the event number field 1623. Furthermore, using the management data shown in FIG. 16B, it is possible to predict the number of issuance requests using an approximation curve or the like within a range of 30 days before and after the event based on the obtained list of year/month/day information of the same event in the past and the issuance counter field 1620. Note that although a range of 30 days before and after the event is used, the number of days may be changed depending on an event. Although the number of issuance requests is predicted directly from the management data using an approximation curve, the number of requests when there is no event is predicted and the difference between the predicted number of requests and an actual number of requests is determined as an increase/decrease due to the event. Then, it may be possible to adjust the predicted number of requests when there is no event by considering the obtained increase/decrease due to the event.

In step S1730, the CPU 206 compares the value of the variable digit with the number of characters calculated in step S1729. If the value of the variable digit is smaller than the calculated number of characters, the process advances to step S1731; otherwise, the process advances to step S1732. In step S1731, the CPU 206 sets the number of characters calculated in step S1729 in the variable digit, and advances the process to step S1732. This enables adjustment of the number of characters according to the tendency of the number of issuance requests in the event.

In step S1732, the CPU 206 predicts the number of acquisition requests during the current time band, calculates the number of characters based on the predicted number of acquisition requests, and then advances the process to step S1733. Using the management data shown in FIG. 16B, it is possible to predict the number of acquisition requests by obtaining the past tendency for one day using a linear approximation or approximation curve based on the year/month/day/time field 1619 and acquisition counter field 1621. At this time, for example, based on a predicted number of requests and an actual number of requests during the previous time band, the past tendency may be corrected to conform to the actual number of requests.

In step S1733, the CPU 206 compares the value of the variable digit with the number of characters calculated in step S1732. If the value of the variable digit is smaller than the calculated number of characters, the process advances to step S1734; otherwise, the process advances to step S1735. In step S1734, the CPU 206 sets the number of characters calculated in step S1732 in the variable digit, and advances the process to step S1735. This enables adjustment of the number of characters according to the tendency of the number of acquisition requests for a given time band.

In step S1735, the CPU 206 predicts the number of acquisition requests on the current month/day, calculates the number of characters based on the predicted number of acquisition requests, and then advances the process to step S1736 (FIG. 17D). Using the management data shown in FIG. 16B, it is possible to predict the number of acquisition requests by obtaining the past tendency for one day using a linear approximation or approximation curve based on the year/month/day/time field 1619 and acquisition counter field 1621. At this time, for example, based on a predicted number of requests and an actual number of requests on the previous day, the past tendency may be corrected to conform to the actual number of requests.

In step S1736, the CPU 206 compares the value of the variable digit with the number of characters calculated in step S1735 (FIG. 17C). If the value of the variable digit is smaller than the calculated number of characters, the process advances to step S1737; otherwise, the process advances to step S1738. In step S1737, the CPU 206 sets the number of characters calculated in step S1735 in the variable digit, and advances the process to step S1738. This enables adjustment of the number of characters according to the tendency of the number of acquisition requests for each day of each month.

In step S1738, the CPU 206 predicts the number of acquisition requests on the current day of the week, calculates the number of characters based on the predicted number of acquisition requests, and then advances the process to step S1739. Using the management data shown in FIG. 16B, it is possible to predict the number of acquisition requests by obtaining the past tendency for each day of the week using a linear approximation or approximation curve based on the year/month/day/time field 1619 and acquisition counter field 1621. At this time, for example, based on a predicted number of requests and an actual number of requests on the same day of the last week, the past tendency may be corrected to conform to the actual number of requests.

In step S1739, the CPU 206 compares the value of the variable digit with the number of characters calculated in step S1738. If the value of the variable digit is smaller than the calculated number of characters, the process advances to step S1740; otherwise, the process advances to step S1741. In step S1740, the CPU 206 sets the number of characters calculated in step S1738 in the variable digit, and advances the process to step S1741. This enables adjustment of the number of characters according to the tendency of the number of issuance requests for each day of the week.

In step S1741, the CPU 206 obtains a registered event within a range of 30 days before and after the current month/day, predicts the number of acquisition requests in the same event in the past, calculates the number of characters based on the predicted number of acquisition requests, and then advances the process to step S1742. Using the management data shown in FIG. 16B, it is possible to obtain the registered event by obtaining the event number field 1623 associated with the current month/day based on the year/month/day field 1622. Using the management data shown in FIG. 16B, it is possible to acquire a list of year/month/day information of the same event in the past by obtaining the year/month/day field 1622 with the same event number as the previously obtained value of the event number field 1623. Using the management data shown in FIG. 16B, it is possible to predict the number of acquisition requests using an approximation curve or the like within a range of 30 days before and after the event based on the obtained list of year/month/day information of the same event in the past and the acquisition counter field 1621. Note that although a range of 30 days before and after the event is used for descriptive convenience, the number of days may be changed depending on an event. The number of acquisition requests is predicted directly from the management data using an approximation curve for descriptive convenience. However, the number of requests when there is no event is predicted, the difference between the predicted number of requests and an actual number of requests is determined as an increase/decrease due to the event, and then the predicted number of requests when there is no event may be adjusted by considering the obtained increase/decrease due to the event.

In step S1742, the CPU 206 compares the value of the variable digit with the number of characters calculated in step S1741. If the value of the variable digit is smaller than the calculated number of characters, the process advances to step S1743; otherwise, the process advances to step S1744. In step S1743, the CPU 206 sets the number of characters calculated in step S1741 in the variable digit, and advances the process to step S1744. This enables adjustment of the number of characters according to the tendency of the number of acquisition requests in the event.

In step S1744, the CPU 206 checks whether the number of characters can be divided by a dividing character count. If the number of characters cannot be divided, the process advances to step S1745; otherwise, the process ends. In step S1745, the CPU 206 adds the number of characters to the variable digit so that the number of characters can be divided by the dividing character count, and ends the process. With this operation, when the dividing character count is "4", it is possible to set a multiple of "4" as the number of characters. When a code is displayed to the user, it is possible to display the code divided every four characters, thereby enabling the user to readily handle the code. Note that the dividing character count may be an arbitrary constant. Based on the thus generated number of characters, the data transfer apparatus 101 according to the fourth embodiment generates a code.

Figure 18:
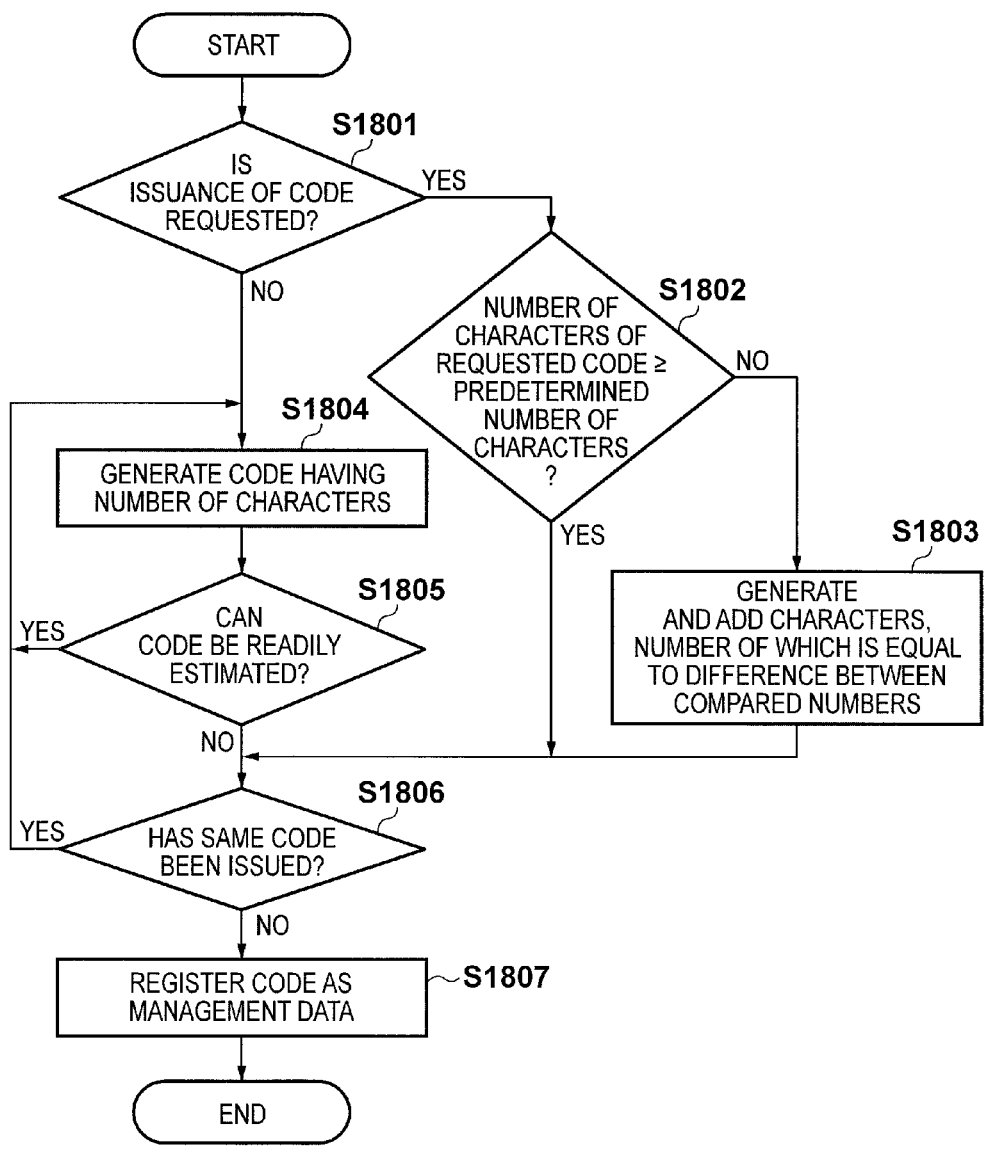
FIG. 18 is a flowchart for describing processing of obtaining a code based on the number of characters determined according to the flowchart shown in FIGS. 17A and 17B in the data transfer apparatus according to the fourth embodiment.

FIG. 18 is a flowchart for describing processing of obtaining a code based on the number of code characters determined according to the flowchart shown in FIGS. 17A through 17D in the data transfer apparatus 101 according to the fourth embodiment. Note that a program for executing this processing is loaded into the RAM 208 in execution, and is executed under the control of the CPU 206.

In step S1801, the CPU 206 determines whether issuance of a code is requested. If issuance is requested, the process advances to step S1802; otherwise, the process advances to step S1804. In step S1802, the CPU 206 compares the number of characters of the requested code with the predetermined number of characters obtained in FIGS. 17A through 17D. If the number of characters of the requested code is equal to or larger than the predetermined number of characters, the process advances to step S1806; otherwise, the process advances to step S1803, and the CPU 206 generates characters, the number of which is equal to the difference between the numbers, and generates a character string having the requested number of characters. Then, the CPU 206 generates a code for the generated character string, and advances the process to step S1806.

In step S1804, the CPU 206 generates a character string (code) having the number of characters generated according to the flowchart of FIGS. 17A through 17D, and advances the process to step S1805. Note that a method of generating a character string need only be able to generate a character string having the necessary number of characters, and does not depend on a character generation method. As an example of a character string generation method, a character string may be generated using a random number, or may be generated by acquiring hash data from temporarily stored information. Alternatively, an available code may be found by sequentially referring to the management data shown in FIGS. 16A and 16B.

The process then advances to step S1805, and the CPU 206 determines whether the character string (code) generated in step S1804 includes a character string which can be readily estimated, such as consecutive identical characters, consecutive numbers, characters arranged in alphabetical order. If it is determined that such character string is included, the process returns to step S1804 to re-generate a code (character string); otherwise, the process advances to step S1806 and the CPU 206 determines whether the code has already been issued. If it is determined that the same code has been issued, the process returns to step S1804 to re-generate a code (character string). Alternatively, if it is determined in step S1806 that the code has not been issued, the process advances to step S1807.

Using the management data shown in FIG. 16A, determination whether the code has been issued is made by determining whether there is the code field 1605 having the same code. Although not shown, in addition to determination whether the code has been issued, whether there is an issued code within a given range of the generated code (an issued code which has a difference with respect to the generated code smaller than a given value, if the generated code is a number) is determined. If there is an issued code within the given range, the same processing as that when there is the same code may be executed. If, for example, the generated code is "3758" and a code "3759" or "3756" has been issued, the process may return to step S1804 to reissue another code.

In step S1807, the CPU 206 registers the generated code as management data, and ends the process. Using the management data shown in FIG. 16A, data obtained by setting the generated code in the code field 1605 is registered. This enables obtainment of, based on the generated number of code characters, a code requested by the user.

Figure 19:
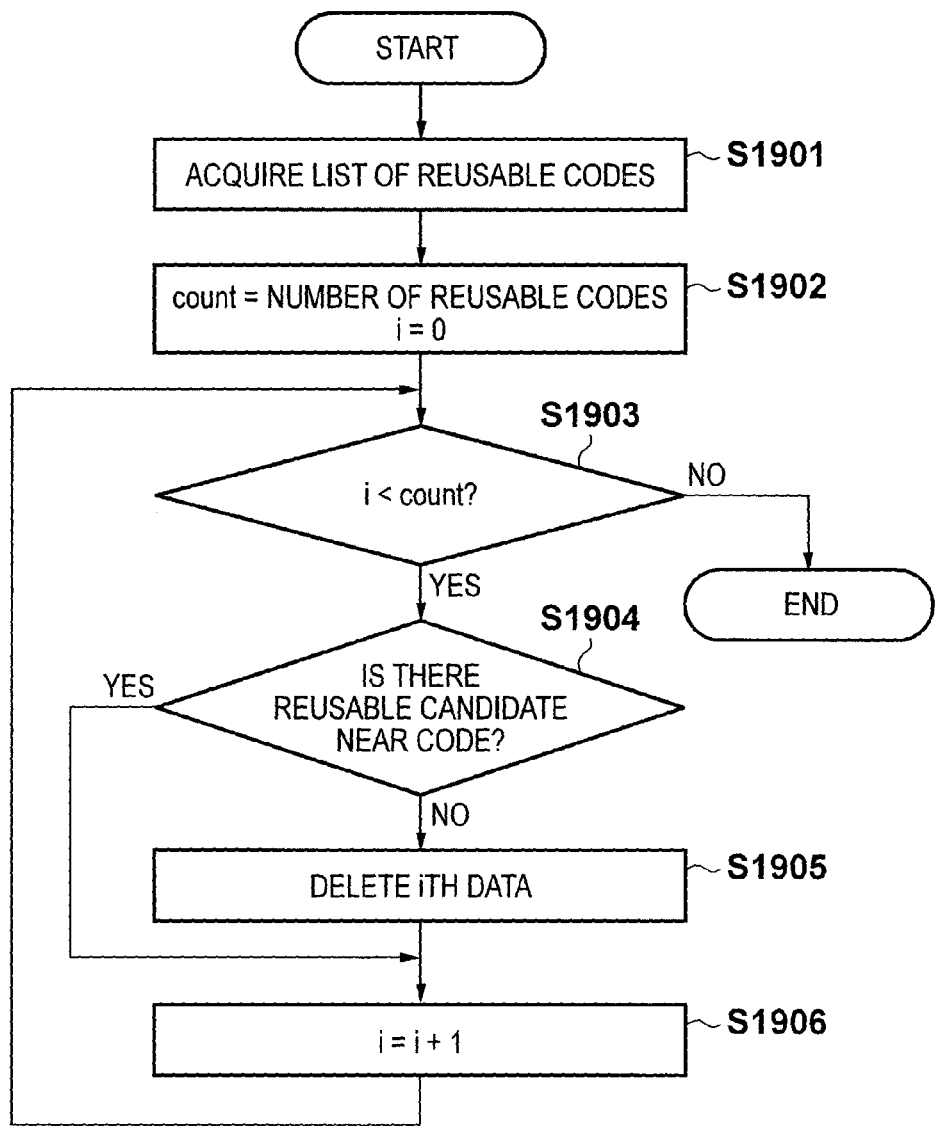
FIG. 19 is a flowchart for describing processing of deleting data from management data of the code generated in the data transfer apparatus according to the fourth embodiment.

FIG. 19 is a flowchart for describing processing of deleting data from the management data of the code generated in the data transfer apparatus 101 according to the fourth embodiment. Note that a program for executing this processing is loaded into the RAM 208 in execution, and is executed under the control of the CPU 206.

In step S1901, the CPU 206 acquires a list of reusable codes, and advances the process to step S1902. Using the management data shown in FIG. 16A, the list of reusable codes contains data in which the scheduled stop date/time field 1608 indicates the date/time before the current date/time or the value of the access count field 1610 is equal to or larger than that of the maximum access count field 1609. That is, the processing in step S1901 is to acquire a list of codes which are invalid and should be deleted from the existing codes. At this time, it is possible to avoid the reuse of a code with a recent issue date/time by adding a search condition that a given period of time has elapsed after the date/time indicated by the issue date/time field 1607. Furthermore, by adding a search condition that a given period of time has elapsed after the date indicated by the last access date field 1611, it is possible to avoid the reuse of a code when the code is accessed even though the code cannot be acquired.

The process then advances to step S1902, and the CPU 206 sets the total number of codes of the list acquired in step S1901 in a variable count (stored in the RAM 208), sets "0" in a variable i (stored in the RAM 208), and then advances the process to step S1903. In step S1903, the CPU 206 compares the variable i with the variable count. If the variable i is smaller than the variable count, the process advances to step S1904; otherwise, the process ends. In step S1904, the CPU 206 determines whether there is a reusable code within a given range of a code indicated by the variable i. If there is a reusable code within the given range, the process advances to step S1906; otherwise, the process advances to step S1905. If, for example, the code indicated by the variable i is "3758" and there is a reusable code "3759", "3756", or the like, the process advances to step S1906. With this operation, if there is a code within a given range, it is possible to delete the code so as not to be reused. This can simultaneously delete codes within the given range, thereby decreasing a reuse frequency.

In step S1905, the CPU 206 deletes the code indicated by the variable i and data associated with the code from the management data, and advances the process to step S1906. In step S1906, the CPU 206 increments the variable i, and returns the process to step S1903. This enables reuse of an issued invalid code.

Note that by deleting a code and its associated data from the management data in step S1905, the code is considered as data which has not been generated, thereby enabling reuse of the code. Instead of deletion, however, a reusable code may be returned. In this case, the sent reusable code is used as a generated code in the code generation processing in step S1804 of FIG. 18, thereby reusing the code.

Note that although the number of characters is used in the fourth embodiment, the number of character types used for a code can be possible. Furthermore, the number of characters and the number of character types may be simultaneously controlled.

The present invention has been described in detail with reference to the preferred embodiments but is not limited to them. The present invention includes various modifications without departing from the spirit and scope of the invention. Parts of the above-described embodiments may be combined as needed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-057092, filed Mar. 15, 2011 which is hereby incorporated by reference herein in its entirety.

What is claimed is:
1. A data communication system including a first communication apparatus as a reception side for receiving data, a second communication apparatus as a transmission source for transmitting data, and a server,
wherein the first communication apparatus comprises a first processor and a first memory configured to store at least one first program executable by the first processor, the at least one first program comprising program code that, when executed by the first processor, implements the steps of:

acquiring a first name of a reception folder associated with a reception ID for specifying the first communication apparatus, by requesting for the server, wherein the first name is named by a user of the second communication apparatus;

notifying the second communication apparatus of the acquired first name of reception folder;

storing the first name of reception folder notified to the second communication apparatus in association with a second name of the second communication apparatus, wherein the second name is named by a user of the first communication apparatus;

requesting for the server a list of data in the reception folder associated with the reception ID;

obtaining the list of data in the reception folder associated with the reception ID from the server;

displaying the second name of the second communication apparatus associated with the first name of reception folder corresponding to the list of data; and requesting, for the server, acquisition data in the reception folder based on the list of data, and wherein the second communication apparatus comprises a second processor and a second memory configured to store at least one second program executable by the second processor, the at least one second program comprising program code that, when executed by the second processor, implements the steps of:

requesting for the server to register data in the reception folder corresponding to the notified first; and transmitting the data to the server, wherein the server transmits the list of data in the reception folder associated with the reception Ill to the first communication apparatus in response to the request in the requesting for the list, and transmits the data acquired from the reception folder to the first communication apparatus in response to the request in the requesting data.

2. The system according to claim 1, wherein the reception folder includes information indicating a reception enable/disable state.

3. The system according to claim 1, wherein the displaying displays the second name of the second communication apparatus that is stored in association with a name of the reception folder for storing data that is not transmitted to the first communication apparatus.

4. The system according to claim 1, wherein the first communication apparatus requests the reception ID for the server and obtains the reception ID.

5. The system according to claim 1, wherein the second communication apparatus notifies the first communication apparatus of having transmitted the data to the server.

6. A method of controlling a data communication system which includes a first communication apparatus as a reception side for receiving data, a second communication apparatus as a transmission source for transmitting data, and a server, the method comprising:

acquiring, for the first communication apparatus, a first name of a reception folder associated with a reception ID for specifying the first communication apparatus by requesting for the server, wherein the first name is named by a user of the second communication apparatus;

notifying, for the first communication apparatus, the second communication apparatus of the acquired first name of reception folder;

storing, for the first communication apparatus, the first name of reception folder notified to the second communication apparatus in association with a second name of the second communication apparatus, wherein the second name is named by a user of the first communication apparatus;

requesting, for the first communication apparatus, a list of data in the reception folder associated with the reception ID for the server;

obtaining the list of data in the reception folder associated with the reception ID from the server;

displaying the second name of the second communication apparatus associated with the first name of reception folder corresponding to the list of data;

requesting for the server, for the first communication apparatus, acquisition data in the reception folder based on the list of data for the server; and requesting for the server, for the second communication apparatus, to register data in the reception folder corresponding to the notified first name and transmitting the data to the server, wherein the server transmits the list of data in the reception folder associated with the reception ID to the first communication apparatus in response to the request of the list of data, and transmits the data acquired from the reception folder to the first communication apparatus in response to the request of the acquisition target data.

* * * * *